US011188259B2

(12) United States Patent
Park et al.

(10) Patent No.: US 11,188,259 B2
(45) Date of Patent: Nov. 30, 2021

(54) STORAGE DEVICE AND METHOD OF OPERATING THE STORAGE DEVICE

(71) Applicant: SAMSUNG ELECTRONICS CO., LTD., Suwon-si (KR)

(72) Inventors: Dae-Kyu Park, Hwaseong-si (KR); Young Ik Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 16/361,253

(22) Filed: Mar. 22, 2019

(65) Prior Publication Data

US 2019/0294376 A1 Sep. 26, 2019

(30) Foreign Application Priority Data

Mar. 22, 2018 (KR) .................. 10-2018-0033484

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0679* (2013.01); *G06F 12/10* (2013.01); *G06F 2212/657* (2013.01)

(58) Field of Classification Search
CPC .... G05F 3/0659; G06F 3/0604; G06F 3/0679; G06F 12/00; G06F 12/10; G06F 13/00
USPC ................. 711/100, 103, 154, 200
See application file for complete search history.

(56) References Cited

U.S. PATENT DOCUMENTS

| | | | |
|---|---|---|---|
| 6,952,743 B2 | 10/2005 | Ortega, III et al. | |
| 7,555,624 B2 | 6/2009 | Hamada | |
| 7,653,831 B2 | 1/2010 | Okamoto et al. | |
| 8,527,693 B2 | 9/2013 | Flynn et al. | |
| 8,930,606 B2 | 1/2015 | Stenfort | |
| 2006/0271809 A1* | 11/2006 | Ichikawa | G06F 11/0727 714/2 |

(Continued)

OTHER PUBLICATIONS

JEDEC Standard, Embedded Multi-Media Card (e•MMC) Electrical Standard (5.1), JESD84-B51(Revision of JESD84-B50.1, Jul. 2014), Feb. 2015.

(Continued)

*Primary Examiner* — Tuan V Thai
(74) *Attorney, Agent, or Firm* — Volentine, Whitt & Francos, PLLC

(57) ABSTRACT

A method of operating a storage device including a non-volatile memory includes: the storage device receiving from a host a first write command; determining, based on the first write command, whether first write data for the first write command is sequential data required to be written according to a write request order; writing the first write data in the non-volatile memory; and when the first write data and second write data for a second write command are sequential data, sequentially updating first mapping data including a mapping relationship between a first logical address and a first physical address for the first write data, and updating second mapping data including a mapping relationship between a second logical address and a second physical address for the second write data, according to an order in which the first write command and the second write command are received.

18 Claims, 19 Drawing Sheets

(56) References Cited

U.S. PATENT DOCUMENTS

| | | | |
|---|---|---|---|
| 2008/0059694 A1* | 3/2008 | Lee ..................... | G06F 3/0625 |
| | | | 711/103 |
| 2013/0297854 A1 | 11/2013 | Gupta et al. | |
| 2016/0132251 A1 | 5/2016 | Hwang et al. | |
| 2016/0179423 A1 | 6/2016 | Mizuno et al. | |
| 2017/0024136 A1* | 1/2017 | Tan ..................... | G06F 3/0679 |

OTHER PUBLICATIONS

"Small Computer System Interface(SCSI)", SCSI Trade Association.

* cited by examiner (Set Command Structure)

(Set Command Structure)

(Write Command Structure)

STORAGE DEVICE AND METHOD OF OPERATING THE STORAGE DEVICE

CROSS-REFERENCE TO RELATED APPLICATION

This application claims the benefit of Korean Patent Application No. 10-2018-0033484, filed on Mar. 22, 2018, in the Korean Intellectual Property Office, the disclosure of which is incorporated herein in its entirety by reference.

BACKGROUND

The inventive concept relates to a storage device, and more particularly, to a storage device including a non-volatile memory and a method of operating the storage device.

A flash memory, which is a non-volatile memory, may retain stored data even if power supply is interrupted. Recently, storage devices having flash memories, such as an embedded multimedia card (eMMC), a universal flash storage (UFS), a solid-state drive (SSD), and a memory card, have widely been used to store or move large amounts of data. Methods and devices capable of improving write reliability and write performance of the storage devices have continuously been required.

SUMMARY

The inventive concept provides a storage device that determines sequential data without degrading performance, and guarantees an order of writing of the sequential data.

The inventive concept also provides a method of operating the storage device.

According to an aspect of the inventive concept, there is provided a method of operating a storage device including a non-volatile memory, the method including: the storage device receiving from a host a first write command; determining, based on the first write command, whether first write data for the first write command is sequential data required to be written according to a write request order; writing the first write data in the non-volatile memory; and when the first write data and second write data for a second write command are the sequential data, sequentially updating first mapping data, including a first mapping relationship between a first logical address and a first physical address for the first write data, and second mapping data for the second write data, including a second mapping relationship between a second logical address and a second physical address, according to an order in which the first write command and the second write command are received.

According to an aspect of the inventive concept, there is provided a method of operating a storage device including a non-volatile memory, the method including: the storage device receiving from a host a first write command, a first logical address, and first write data, determining whether the first write data is sequential data, based on a first flag bit of the first write command, programming the first write data into a first area of the non-volatile memory corresponding to a first physical address and updating first mapping data including a mapping relationship between the first logical address and the first physical address for the first write data, wherein, when second write data for a second write command received before the first write command is the sequential data, then updating the first mapping data comprises updating the first mapping data after updating second mapping data for the second write data when it is determined based on the first flag bit of the first write command that the first write data is the sequential data.

According to an aspect of the inventive concept, there is provided a method of operating a storage device including a non-volatile memory, the method including: the storage device receiving host information on a first address area, the storage device receiving from the host a first write command including a first write address and first write data for the first write command, determining whether the first write data is sequential data requiring a write order guarantee according to a write request order, based on the information on the first address area and the first write address, and when the first write data and second write data for a second write command are the sequential data, updating first address mapping data for the first write data and second address mapping data for the second write data, based on an order in which the first write command and the second write command are received.

According to an aspect of the inventive concept, there is provided a storage device, including: a non-volatile memory and a controller configured to control access to the non-volatile memory, wherein the controller comprises: a command classification module that determines, based on a first write command received by the storage device from a host, whether first write data for the first write command is sequential data, and a mapping manager that determines an order of updating of logical-physical address mapping data for the first write data, based on an order in which the first write command and another write command corresponding to other sequential data are received from the host, when the first write data is determined to be sequential data.

According to another aspect of the inventive concept, a method comprises: a storage device, which includes a non-volatile memory, receiving from a host a first write command and a second write command; determining, based on the first write command, whether first write data for the first write command is first sequential data whose permanence is required to be guaranteed according to an order in which the first write command is received; determining, based on the second write command, whether second write data for the second write command is second sequential data whose permanence is required to be guaranteed according to an order in which the second write command is received; writing the first write data and the second write data to the non-volatile memory; and when the first write data and second write data for a second write command are the sequential data, sequentially guaranteeing the permanence of the first write data and the second write data according to the order in which the first write command is received and the order in which the second write command is received.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Hereinafter, embodiments of the present disclosure will be described in detail with reference to the accompanying drawings.

Figure 1:
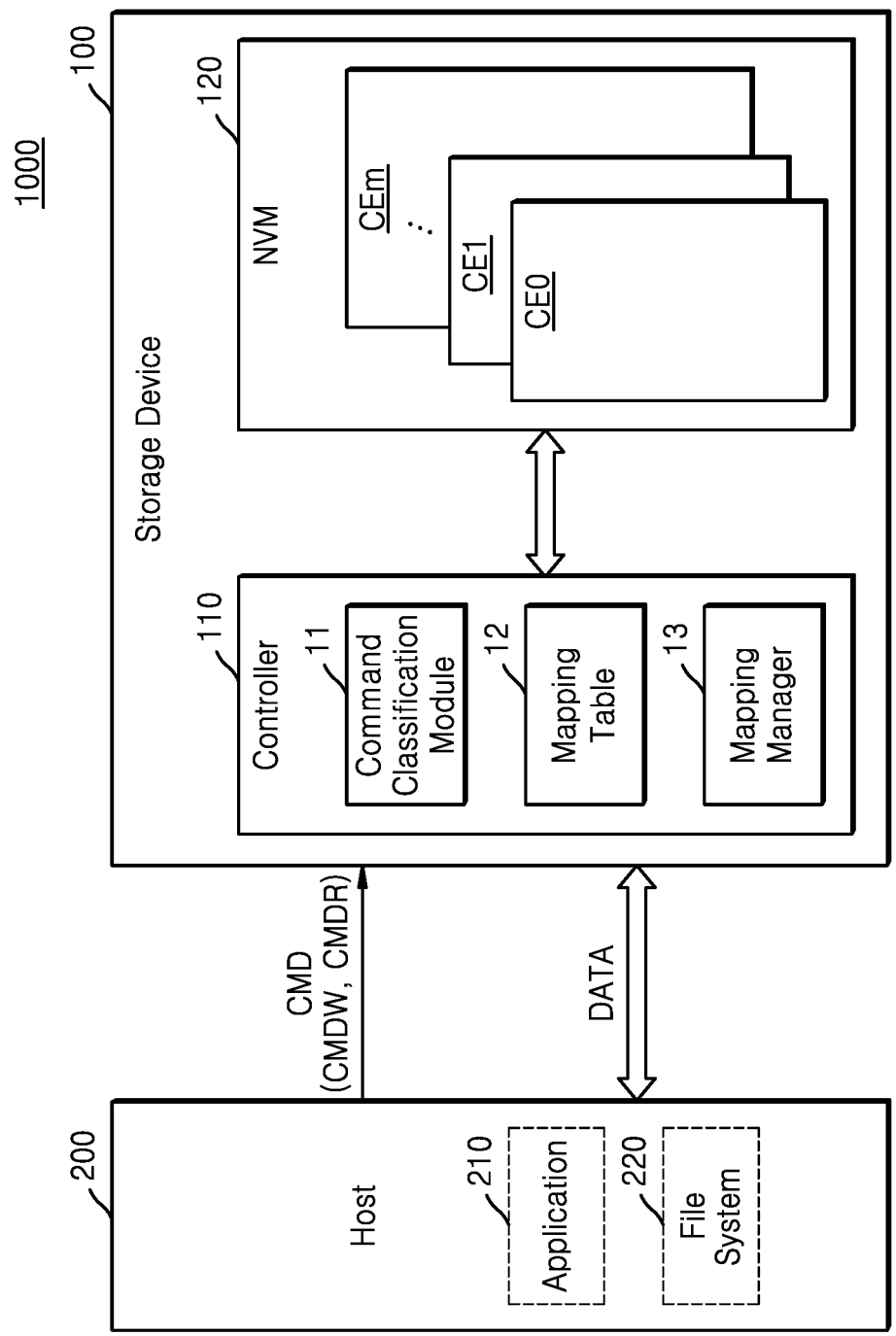
FIG. 1 is a block diagram of an embodiment of a storage system.

FIG. 1 is a block diagram of an embodiment of a storage system 1000.

Storage system 1000 may be embedded in an electronic device or implemented as an electronic device. The electronic device may be implemented, for example, as a personal computer (PC), a data server, a network-attached storage (NAS), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like.

Referring to FIG. 1, storage system 1000 may include a storage device 100 and a host 200.

Host 200 may store data in storage device 100 and read data from storage device 100. Host 200 may refer to a data processing apparatus capable of processing data, for example, as a central processing unit (CPU), a processor, a microprocessor, or an application processor (AP). For example, host 200 may be implemented as a system-on-a-chip (SoC).

Host 200 may communicate with storage device 100 through various interfaces. Host 200 may send a command CMD, for example, a write command CMDW and a read command CMDR, to storage device 100, and storage device 100 may respond to the command CMD. In an embodiment, host 200 may send a setup command to storage device 100 to set an execution condition of the write command CMDW or the read command CMDR, and storage device 100 may execute the write command CMDW or the read command CMDR based on the setup command.

Some data, which host 200 requests to write in storage device 100, may be sequential data. The sequential data may be data to be written in a predefined order. For example, when first to third data are sequentially received (or first to third commands corresponding to the first to third data are sequentially received) and the first to third data are sequential data, the second data has to be written to storage device 100 after the first data is written to storage device 100. Also, the third data has to be written to storage device 100 after the second data is written to storage device 100.

For example, journal data of a file system 220 may be sequential data. Host 200 may store or read data generated by executing an application 210 or data required for executing application 210 in or from storage device 100, based on file system 220. File system 220 allocates an address at which user data is to be stored, in response to a command from application 210. File system 220 may be updated by changes occurring while storing a file in file system 220, and the journal data may include information on details to be updated when file system 220 is updated. As another example, during the execution of application 210, application 210 may request writing of sequential data according to the purpose of data.

Host 200 may provide information on sequential data to storage device 100 via the write command CMDW and/or a separate setup command, and storage device 100 may determine whether or not data requested to be written is sequential data, based on received information and by using methods described below and may maintain (or guarantee) an order of writing of the sequential data.

Storage device 100 may include a controller 110 and a non-volatile memory 120. In some embodiments, storage device 100 may be an internal memory embedded in an electronic device. For example, storage device 100 may be an embedded multimedia card (eMMC), a solid state drive (SSD), or an embedded universal flash storage (UFS) memory device. In some embodiments, storage device 100 may be an external memory detachably attached to an electronic device. For example, storage device 100 may be a UFS memory card, a compact flash (CF) card, a secure digital (SD) card, a micro-secure digital (Micro-SD) card, a mini-secure digital (Mini-SD) card, an extreme digital (xD) card, or a memory stick.

Non-volatile memory 120 may include a plurality of memory devices CE0 to CEm (e.g., memory chips). The plurality of memory devices CE0 to CEm may constitute different channels or ways. Each of the plurality of memory devices CE0 to CEm may include a memory cell array (MCA) having a plurality of memory cells. In an embodiment, the memory cell array MCA may include a plurality of flash memory cells. For example, the plurality of flash memory cells may be NAND flash memory cells. However, embodiments of the present disclosure is not limited thereto, and memory cells in the memory cell array MCA may be resistive memory cells such as resistive RAM (ReRAM) memory cells, phase change RAM (PRAM) memory cells, and magnetic RAM (MRAM) memory cells. In the following description, it is assumed that non-volatile memory 120 is a flash memory.

In an embodiment, the memory cell array MCA may be a three-dimensional (3D) memory array. The 3D memory array is monolithically formed in at least one physical level of memory cell arrays having an active area located above a silicon substrate and a circuit associated with operations of the memory cells, the circuit being formed on or in the silicon substrate. The term "monolithic" means that layers of each level of the memory cell array are stacked directly on layers of each lower level of the memory cell array. In an embodiment, the 3D memory array may include vertical NAND strings arranged in a vertical direction such that at least one memory cell is located above another memory cell. The at least one memory cell may include a charge trap layer.

U.S. Pat. Nos. 7,679,133, 8,553,466, 8,654,587, and 8,559,235, and U.S. Patent Application Publication No. 2011/0233648 disclose appropriate configurations of 3D memory cell arrays which include a plurality of levels and in which word lines and/or bit lines are shared between the levels, and are incorporated herein by reference.

Controller 110 may control non-volatile memory 120 to write data in non-volatile memory 120 in response to a write request from host 200 or to read data stored in non-volatile memory 120 in response to a read request from host 200. In an embodiment, controller 110 may include a command classification module 11, a mapping manager 13, and a mapping table 12. Although mapping table 12 is shown in FIG. 1 as being included in controller 110, the inventive concept is not limited thereto. In some embodiments, mapping table 12 may be loaded in a memory chip outside a controller chip in which controller 110 is implemented, for example, a dynamic random access memory (DRAM) chip or a non-volatile memory chip.

Command classification module 11 may determine whether or not data DATA to be written (hereinafter referred to as write data) is sequential data, based on the write command CMDW. In other words, command classification module 11 may determine whether or not the write data according to the write command CMDW is required to be written according to a write request order.

In an embodiment, command classification module 11 may comprise software or code in the form of instructions which may be executed by a processor of controller 110 to accomplish the various operations described herein. In other embodiments, command classification module 11 may be implemented in hardware. Further details will be described below. In an embodiment, command classification module may determine whether a write address in the write command CMDW corresponds to a preset address area (hereinafter, referred to as a sequential data address area), and may determine whether write data is sequential data, based on a result of the determining. In another embodiment, command classification module 11 may determine whether write data is sequential data, based on a sequential write flag bit in the write command CMDW. A method of determining whether or not write data is sequential data will be described in more detail with reference to FIGS. 6 to 12.

Mapping table 12 may store mapping information, that is, mapping data, indicating a relationship between a logical address received from host 200 and a physical address indicating a physical location in non-volatile memory 120 at which data is actually accessed. The mapping data may be referred to as address mapping data or logical-physical address mapping data. The logical address may be an address recognized by host 200 and the physical address may indicate the location of memory cells of non-volatile memory 120 corresponding to the logical address. In an embodiment, the physical address may include a physical block number and a physical page number. By referring to the mapping information in mapping table 12, a logical address provided from host 200 may be converted into a physical address indicating a physical location of memory cells of non-volatile memory 120 to be actually accessed.

The mapping information may be stored in a meta data storage area of non-volatile memory 120, or in a separate non-volatile memory device provided inside or outside controller 110, and the mapping information may be loaded into mapping table 12.

Mapping manager 13 may manage mapping table 12. For example, mapping manager 13 may manage mapping table 12 by allocating a physical address for a logical address and storing mapping data which maps the logical address and a changed physical address when the physical address for the logical address is changed. Mapping manager 13 may also update the mapping data by writing the mapping data to non-volatile memory 120 or a separate non-volatile memory device provided inside or outside controller 110.

When received write data is sequential data, controller 110 may guarantee an order of writing of the sequential data. In the present disclosure, guaranteeing the order of writing of the sequential data means that the pieces of sequential data are written based on an order in which write commands corresponding to the sequential data are received. For example, when a second write command and second sequential data are received after a first write command and first sequential data are received, controller 110 may write the first sequential data in non-volatile memory 120 and then write the second sequential data in non-volatile memory 120. In the present disclosure, the order of writing of the sequential data may mean an order in which the permanence of the sequential data is guaranteed. Although data is programmed in non-volatile memory 120, if mapping data for the programmed data is not updated, host 200 may not access the data. The mapping data for the data needs to be updated, that is, the mapping data needs to be stored in non-volatile memory 120 or a separate non-volatile memory device, so that the data is permanently written. Thus, in the following description, a write order may mean an order in which mapping data for write data is updated after the write data is programmed.

Mapping manager 13 may determine an update order so that the mapping data is updated according to an order in which writing is requested for a plurality of pieces of write data determined as sequential data in command classification module 11, and may update the mapping data according to the determined update order, and thus, the write order (or permanence order) of the sequential data may be ensured.

Figure 2:
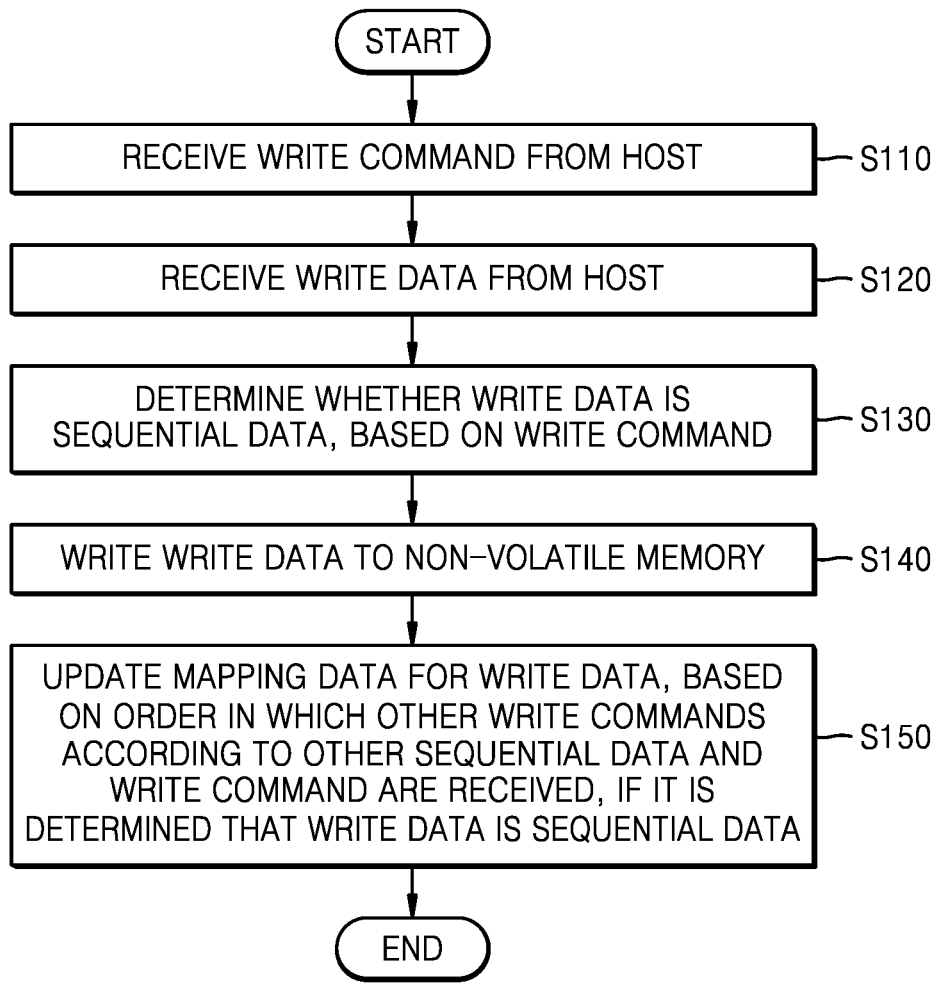
FIG. 2 is a flowchart illustrating an embodiment of a method of operating a storage device.
Figure 3:
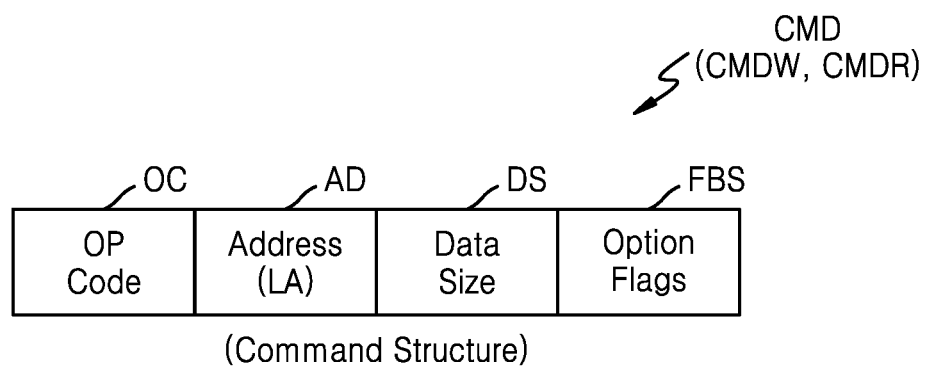
FIG. 3 is a diagram illustrating a structure of a command.

FIG. 2 is a flowchart illustrating an embodiment of a method of operating a storage device, and FIG. 3 is a diagram illustrating a structure of a command. The operating method of FIG. 2 indicates a process of determining whether write data is sequential data and writing the write data in a memory when the write data is sequential data.

Referring to FIGS. 1 and 2, storage device 100 may receive a write command from host 200 (operation S110). Referring to FIG. 3, a command CMD may include a plurality of bits, and the plurality of bits may include an operation code OC (or a command index), an address AD, a data size DS, and flag bits FBS. The address AD, the data size DS and the flag bits FBS may be collectively referred to as a command argument. In addition, the command CMD may further include a start bit indicating the start of the command CMD, an end bit indicating the end of the command CMD, a transmission bit indicating a subject that generates the command CMD, and a cyclical redundancy check (CRC) bit for detecting an error that may occur upon transmission of the command CMD.

The operation code OC, which is a plurality of bits indicating the type of command, may indicate a certain command of a plurality of commands that may be executed by storage device 100. For example, when the operation code OC is 1, the command CMD may be a write command CMDW, and when the operation code OC is 2, the command CMD may be a read command CMDR. Storage device 100 may determine which command has been received, according to the operation code OC, and may perform an operation according to the operation code OC.

The address AD indicates a starting point to be written or read and may be a logical address. The data size DS may include data size information of read data or write data. The flag bits FBS may include various mode information. In an embodiment, when the command CMD is a write command CMDW, at least one bit of the flag bits FBS may be a sequential write flag bit indicating whether write data corresponding to the write command CMDW is sequential data. For example, the sequential write flag bit may be set (e.g., a value of 1) to indicate that the write data corresponding to the write command CMDW is sequential data, and the sequential write flag bit may be not set (e.g., a value of 0) to indicate that the write data corresponding to the write command CMDW is not sequential data.

Referring to FIG. 2 again, storage device 100 may receive write data from host 200 (operation S120). Storage device 100 may receive write data having a size corresponding to the data size DS included in the write command CMDW.

Storage device 100 may determine whether the write data is sequential data, based on the write command (operation S130). In an embodiment, storage device 100 may determine whether an address included in a write command corresponds to a preset sequential data address area, and may determine whether write data is sequential data, based on a result of the determining In another embodiment, storage device 100 may determine whether write data is sequential data, based on a sequential write flag bit included in a write command. As described above with reference to FIG. 1, command classification module 11 may determine whether write data is sequential data, based on a write command.

Storage device 100 may write the write data in non-volatile memory 120 (operation S140). That is, the write data may be programmed into non-volatile memory 120.

When the write data is programmed into non-volatile memory 120, storage device 100 may update mapping data for the write data. For example, controller 110 may update the mapping data when a program completion signal is received from non-volatile memory 120. In this case, if it is determined in operation S130 that the write data for a given write command is sequential data, storage device 100 may update the mapping data for the write data, based on an order in which other write commands, according to other sequential data, and the given write command are received from host 200 (operation S150).

For example, when first write data corresponding to a first write command received from host 200 is sequential write data and second write data corresponding to a second write command is sequential write data, storage device 100 may update, in turn, first mapping data for the first write data and second mapping data for the second write data according to an order in which the first write command and the second write command are received, after the first write data and the second write data are programmed in non-volatile memory 120. For example, when the first write command is received before the second write command, storage device 100 may update the first mapping data and then update the second mapping data. Thus, storage device 100 may guarantee an order of writing of the sequential data.

Even if host 200 sequentially transmits a plurality of write commands and a plurality of pieces of write data corresponding to the plurality of write commands to storage device 100, the pieces of data are not guaranteed to be written into the non-volatile memory 120 according to the order in which the corresponding write commands are received, due to an internal structure and policies (e.g., the presence of a data buffer operating as a cache, a chip-level parallel operation, etc.) in storage device 100 including non-volatile memory 120. In addition, even if writing is sequentially started, updating of the mapping data may not be sequentially performed.

Storage system 1000 may issue a flush command or a barrier command to guarantee an order of writing of data (specifically, a permanence order). However, when the flush command is issued, host 200 may issue a next command after the writing of all the previously received data is completed and thus it takes a considerable amount of time to process the flush command. When the flush command is frequently executed, the performance of storage device 100 may be degraded. In addition, as the barrier command is issued, an order of writing of write data may be guaranteed between write commands issued before and after the issuance of the barrier command, but an order of writing of data for a plurality of write commands before the issuance of the barrier command is not guaranteed.

Accordingly, in order for a write order to be guaranteed for a plurality of write commands, a barrier command would have to be issued every time a write command is issued.

However, in storage system 1000 according to the embodiment, even if there is no issuance of a command (e.g., a flush command, a barrier command, etc.) for guaranteeing a write order, storage system 1000 may determine whether write data is sequential data based on information on a sequential data address area or identification information, provided from host 200, and may guarantee a write order (a permanence order) when the write data is sequential data. Accordingly, storage system 1000 does not require a separate command to be issued between write commands to guarantee a write order, and thus, unnecessary time may be prevented from being wasted and write performance may be improved. In addition, storage device 100 may update mapping data based on an order in which write commands are received for sequential data, thereby guaranteeing a permanence order. Accordingly, the write reliability and write performance of storage system 1000 may be improved.

Figure 4A:
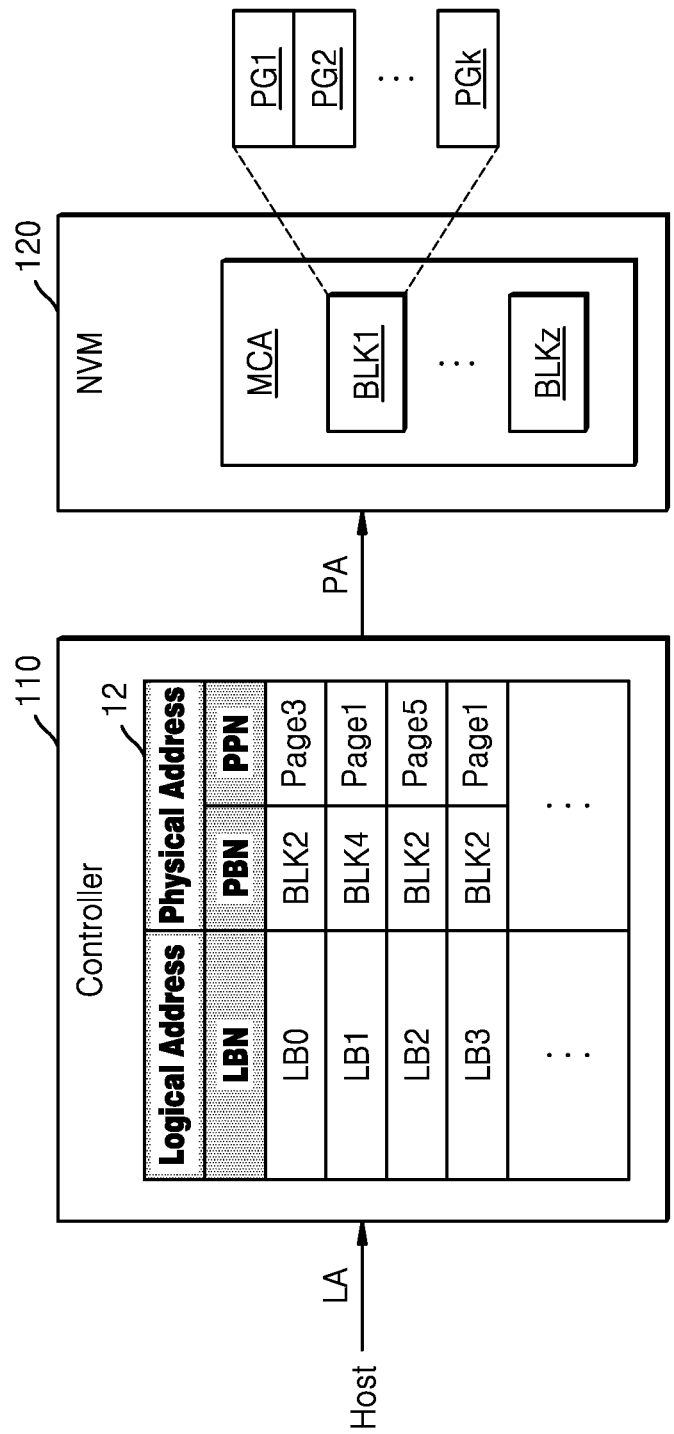
FIG. 4A and FIG. 4B are diagrams for explaining mapping data and the updating of mapping data.
Figure 4B:
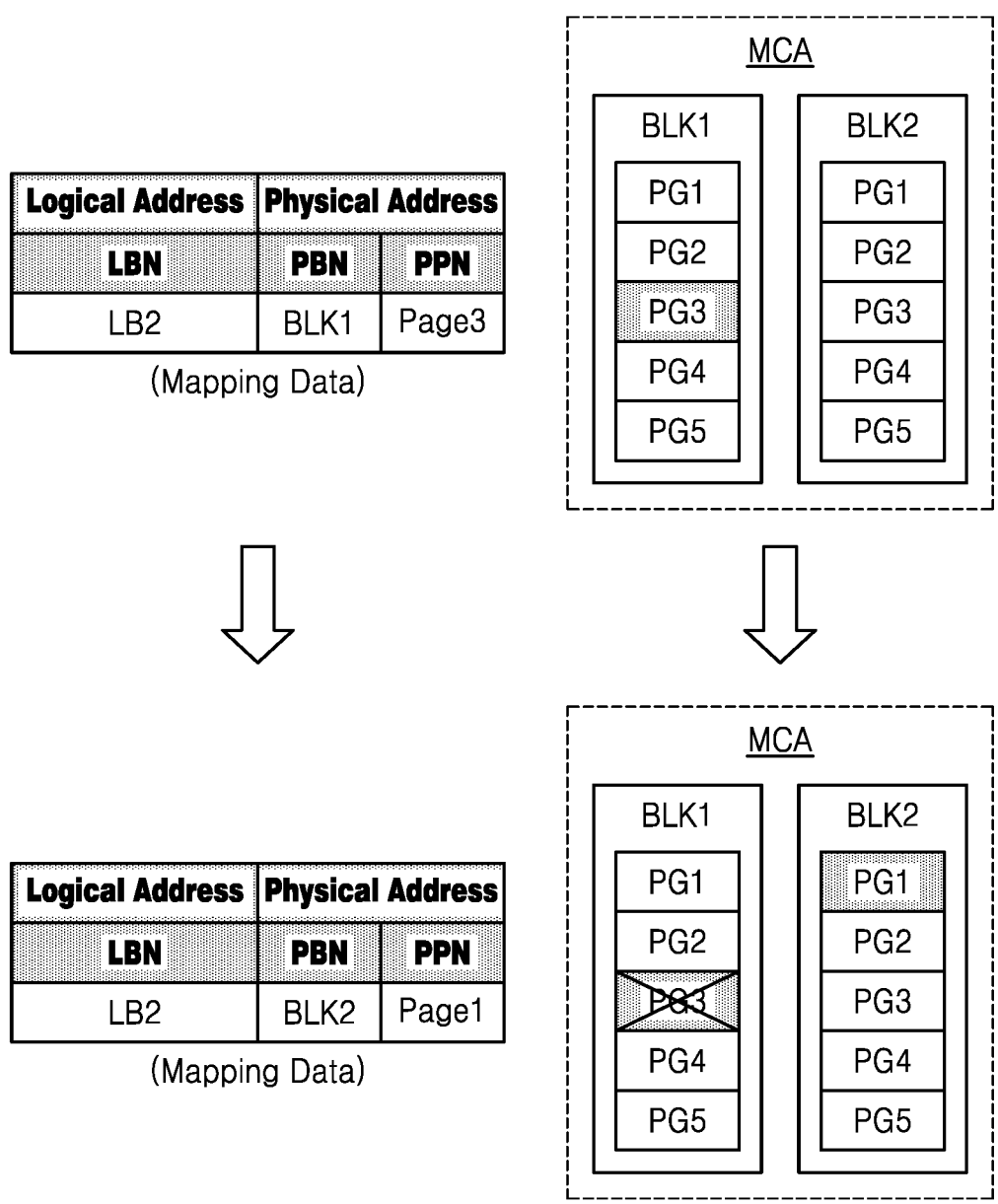

FIGS. 4A and 4B are diagrams for explaining mapping data and the updating of mapping data.

Referring to FIG. 4A, controller 110 may convert a logical address LA provided from a host (e.g., host 200) into a physical address PA based on mapping data stored in mapping table 12. Non-volatile memory 120 may include a memory cell array MCA, the memory cell array MCA may include memory blocks BLK1 to BLKz, and the memory block BLK1 may include a plurality of pages PG1 to PGk. Here, z and k may be positive integers and may be variously changed according to embodiments. For example, a memory block may be a unit in which memory cells are erased in non-volatile memory 120, and a page may be a unit by which memory cells are written to and read from non-volatile memory 120. In some embodiments, the memory cell array MCA may be included in a plurality of planes, a plurality of dies, or a plurality of chips.

Mapping table 12 may include mapping data including a physical address corresponding to a logical address. For example, the logical address may include a logical block number LBN, and the physical address may include a physical block number PBN and a physical page number PPN. However, embodiments are not limited thereto, and a method of mapping the logical address and the physical address may vary, and the mapping data may have a mapping structure according to one of various mapping methods.

Controller 110 may refer to mapping table 12 to thereby convert the logical address LA into a physical address PA specifying a block and a page on the memory cell array MCA, and may provide the physical address PA to non-volatile memory 120.

In non-volatile memory 120 such as a NAND flash memory, data writing and reading may be performed on a page basis and electrical erasing may be performed on a block basis. In addition, an electrical erase operation of a block is required before writing, and thus, overwriting is impossible. Thus, as shown in FIG. 4B, when writing is requested again with respect to a previously written logical address (e.g., LA2), storage device 100 may not write data in a previously written physical address (e.g., BLK1 and PG3). Storage device 100 may change the physical address by allocating a new physical address (e.g., BLK2 and PG1) corresponding to the logical address (e.g., LA2), and may write data in a physical area corresponding to the changed physical address. Data stored in the previously written physical addresses (e.g., BLK1 and PG3) may be processed as invalid data. Mapping data including the changed physical address may be written in non-volatile memory 120 or another non-volatile memory device, thereby updating the mapping data and guaranteeing the permanence of written data.

Figure 5:
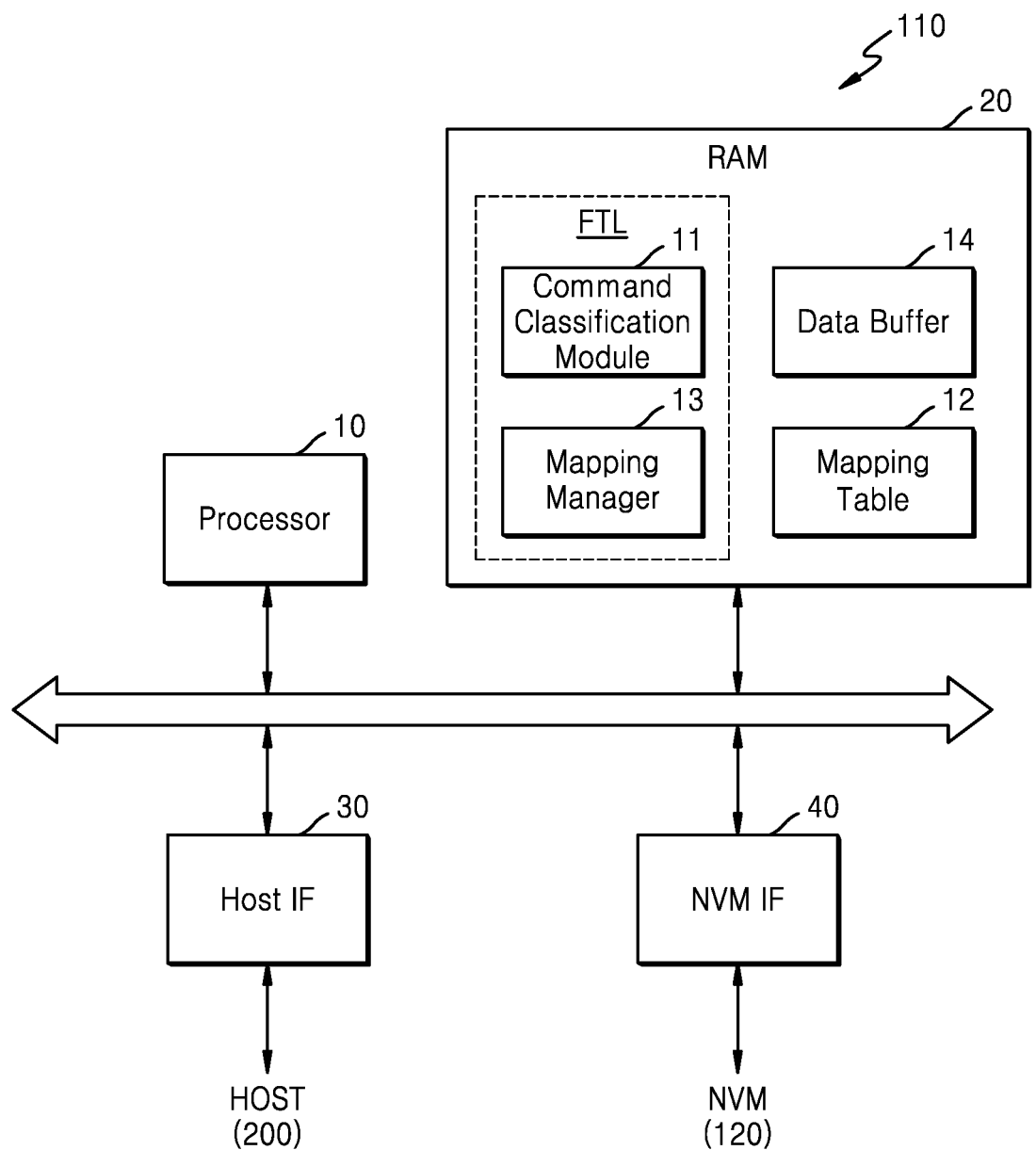
FIG. 5 is a block diagram of an embodiment of a controller of a storage system.

FIG. 5 is a block diagram of an embodiment of controller 110 of a storage system such as storage system 1000.

Referring to FIG. 5, controller 110 may include a processor 10, random access memory (RAM) 20, a host interface 30, and a non-volatile memory interface 40, which may communicate with one another via a bus 60.

Processor 10 may include a central processing unit, a microprocessor, and the like, and may control all operations of controller 110. In an embodiment, processor 10 may be implemented as a multi-core processor, for example, a dual core processor or a quad core processor.

Host interface 30 is configured to communicate with an external host device under the control of the processor 10. Host interface 30 may be configured to communicate by using at least one of various communication methods, such as universal serial bus (USB), advanced technology attachment (ATA), serial advanced technology attachment (SATA), parallel advanced technology attachment (PATA), small computer system interface (SCSI), serial attached SCSI (SAS), high speed interchip (HSIC), peripheral component interconnection (PCI), PCI express (PCIe), nonvolatile memory express (NVMe), universal flash storage (UFS), secure digital (SD), multi-media card (MMC), embedded MMC (eMMC), dual in-line memory module (DIMM), registered DIMM (RDIMM), load reduced DIMM (LRDIMM), enhanced small disk interface (ESDI), and integrated drive electronics (IDE)

In an embodiment, host interface 30 may decode a received command and provide the decoded command to a flash translation layer (FTL).

RAM 20 may operate under the control of processor 10 and may be used as an operation memory, a buffer memory, a cache memory, and the like. For example, RAM 20 may be implemented by a volatile memory such as DRAM and SRAM, or a non-volatile memory such as PRAM or a flash memory. In an embodiment, RAM 20 may be loaded with command classification module 11, mapping manager 13, and mapping table 12. RAM 20 may include a data buffer 14.

Command classification module 11 and mapping manager 13 may be implemented by firmware or software and may be loaded in RAM 20. In an embodiment, command classification module 11 and mapping manager 13 may be implemented in an FTL. However, embodiments are not limited thereto, and command classification module 11 and mapping manager 13 may be implemented by hardware. Mapping table 12 may, for example, store a logical to physical (L2P) mapping table and may be loaded in RAM 20.

Data buffer 14 may temporarily store write data transmitted from the host and data (e.g., mapping data) generated by controller 110, to store the write data and the data in non-volatile memory 120, and/or may temporarily store read data to be transmitted to the host.

Non-volatile memory interface 40 may provide an interface between controller 110 and non-volatile memory 120. For example, mapping table 12, write data, and read data may be transmitted and received between controller 110 and non-volatile memory 120 via non-volatile memory interface 40. In an embodiment, the number of non-volatile memory interfaces 40 may correspond to the number of non-volatile memory chips included in storage device 100 or the number of channels between controller 110 and non-volatile memory 120.

Although not shown in FIG. 5, controller 110 may further include ROM for storing code data for interfacing with a host and an error correction code (ECC) engine for encoding data to be stored in non-volatile memory 120 and for decoding data read from non-volatile memory 120.

Figure 6:
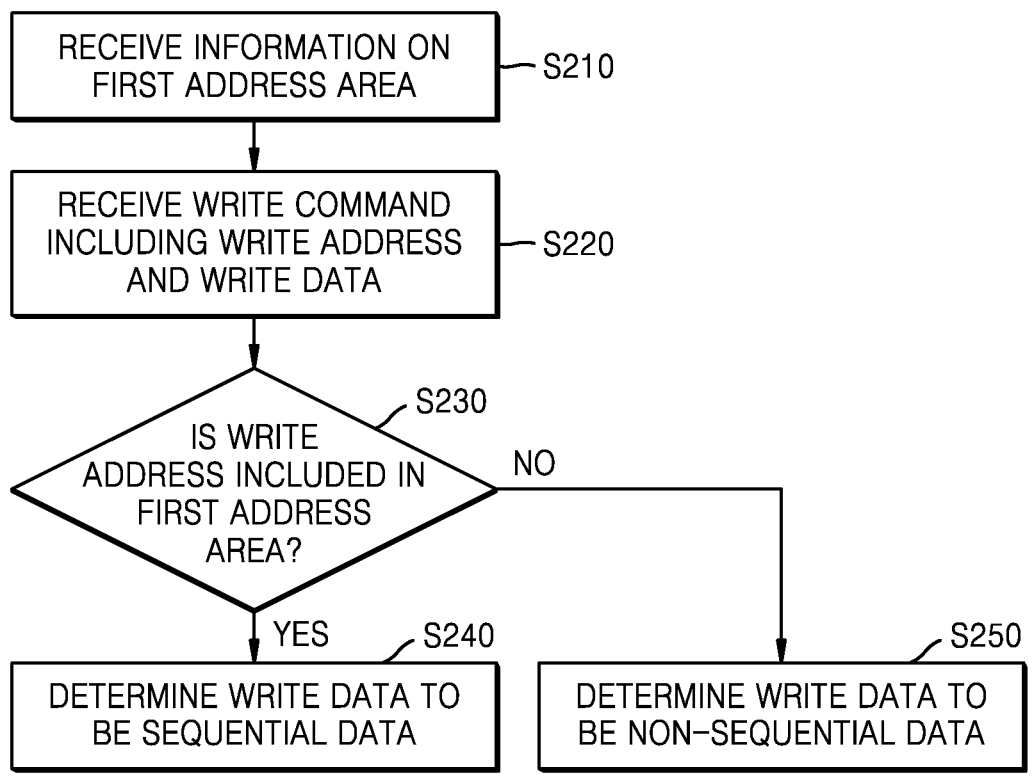
FIG. 6 is a flowchart illustrating an embodiment of a method of determining sequential data.

FIG. 6 is a flowchart illustrating an embodiment of a method of determining sequential data. The method of FIG. 6 may be performed in the controller 110 of FIGS. 1 and 5.

Referring to FIGS. 1 and 6, controller 110 may receive information on a first address area from host 200 (operation S210). For example, controller 110 may receive from host 200 a setup command including the information on the first address area. In this case, the first address area indicates a logical address to which sequential data is to be written. Controller 110 may set the first address area based on the information on the first address area. Thus, a sequential data address area may be set in storage device 100 in advance of receiving a write command and associated write data.

Thereafter, controller 110 may receive a write command including a write address and write data from host 200 (operation S220). As described with reference to FIG. 3, the write command may include an address, i.e., a write address.

Controller 110 may determine whether the write address is included in the first address area, i.e., the sequential data address area (operation S230). If it is determined that the write address is included in the sequential data address area, controller 110 may determine the write data to be sequential data (operation S240). Controller 110 may guarantee an order of writing of the write data, that is, an order of updating of mapping data of the write data. When updating mapping data for a plurality of sequential data, controller 110 may sequentially update the mapping data according to an order in which corresponding write commands are received, thereby guaranteeing an order of writing of the sequential data.

If it is determined that the write address is not included in the sequential data address area, controller 110 may determine the write data to be non-sequential data (operation S250). The non-sequential data is data for which a write order is not specified, and updating of mapping data for the non-sequential data may be performed without considering whether or not mapping data of other data is updated.

Figure 7A:
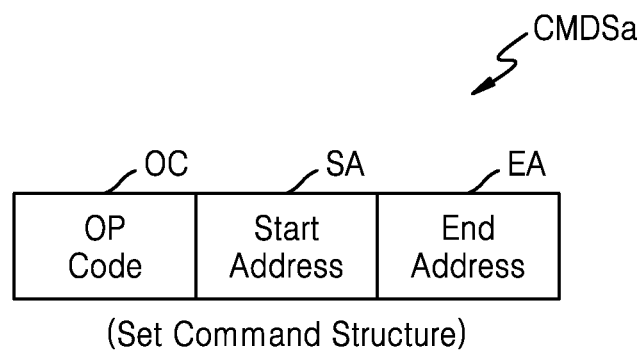
FIG. 7A and FIG. 7B are diagrams illustrating structures of setup commands, each of which includes information on a sequential data address area.
Figure 7B:
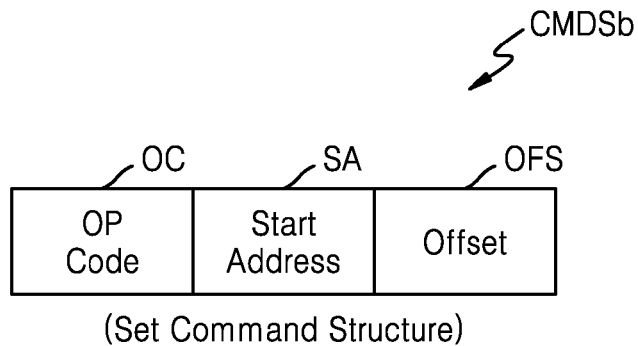

FIGS. 7A and 7B are diagrams illustrating structures of setup commands CMDSa and CMDSb, respectively, each of which includes information on a sequential data address area.

Referring to FIG. 7A, the setup command CMDSa may include an operation code OC, a start address SA, and an end address EA. The operation code OC may indicate that the setup command CMDSa is a command for setting a sequential data address area. The start address SA indicates a logical address at which the sequential data address area starts, and the end address EA indicates a logical address at which the sequential data address area ends. For example, when the sequential data address area is an address 0 to an address 100, the start address SA may include a logical block 0 (e.g., LB0) and the end address EA may include a logical block 100 (e.g., LBN100).

Referring to FIG. 7B, the setup command CMDSb may include an operation code OC, a start address SA, and an offset OFS. The offset OFS may indicate the size of a sequential data address area. For example, when the sequential data address area is an address 0 to an address 100, the start address SA may include a logical block 0 (LBN0) and the offset OFS may include a logical block size 100 (LBS100). In addition, the setup command may have various structures.

Figure 8:
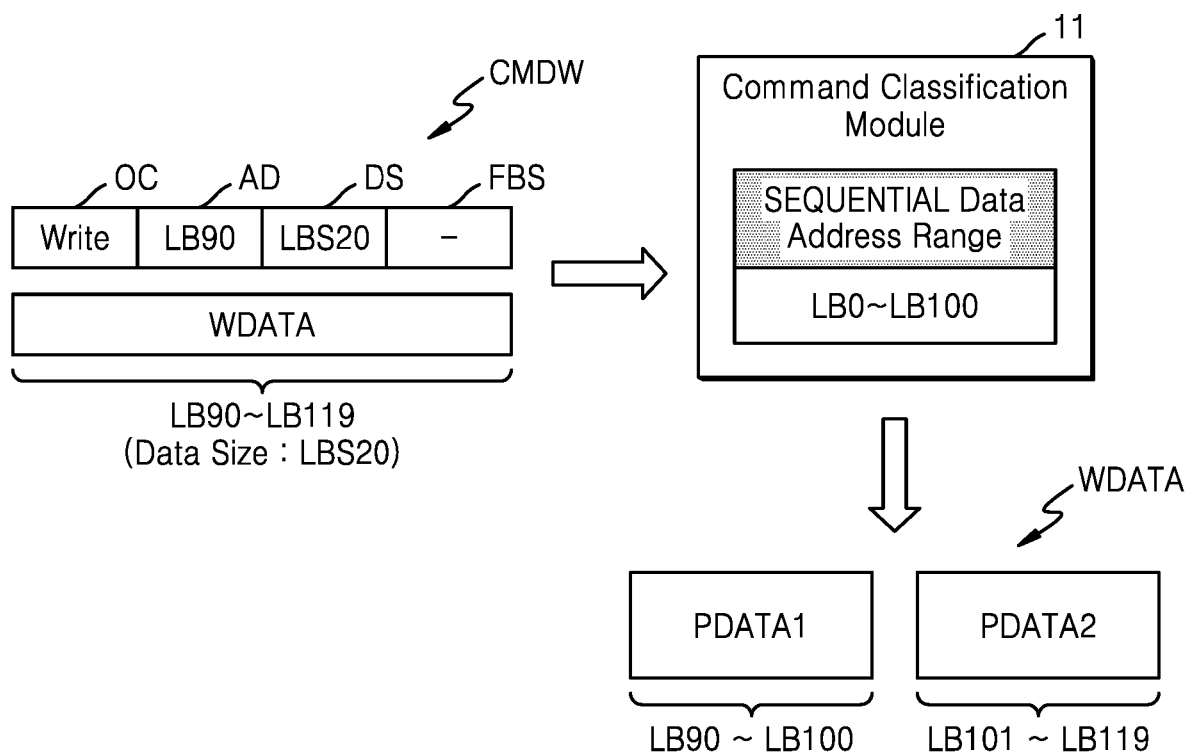
FIG. 8 is a diagram illustrating an embodiment of a method of determining sequential data.

FIG. 8 is a diagram illustrating an embodiment of a method of determining sequential data. FIG. 8 is a diagram illustrating a method of determining whether a part of write data is sequential data and another part is non-sequential data.

Referring to FIG. 8, a preset sequential data address area may be a logical block 0 (LB0) to a logical block 100 (LB100). A received write command CMDW may include an address AD and a data size DS. The address AD may indicate a logical block 91 (LB91), and the data size DS may indicate a logical block size 20 (LBS20). This means that write data WDATA is written in the logical block 91 (LB91) to a logical block 110 (LB110). A command classification module 11 may divide received write data into first partial data PDATA1 corresponding to the logical block 91 (LB91) to the logical block 100 (LB100) and second partial data PDATA2 corresponding to the logical block 101 (LB101) to the logical block 110 (LB110). Command classification module 11 may determine the first partial data PDATA1 to be written in the sequential data address area as sequential data and the second partial data PDATA2 to be written in an area other than the sequential data address area as non-sequential data. Accordingly, a write order for the first partial data PDATA1 may be guaranteed.

Figure 9:
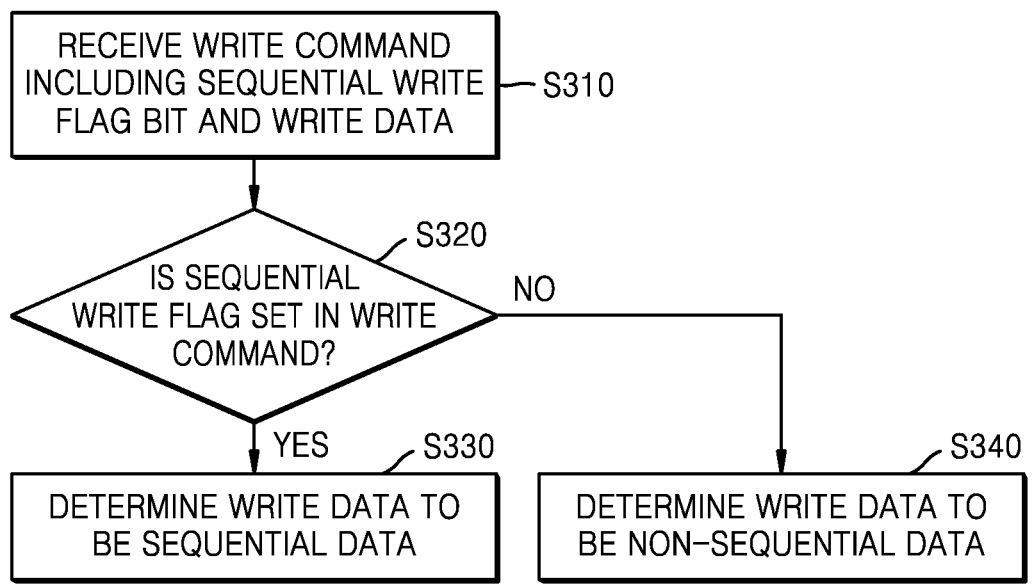
FIG. 9 is a flowchart illustrating an embodiment of a method of determining sequential data.
Figure 10:
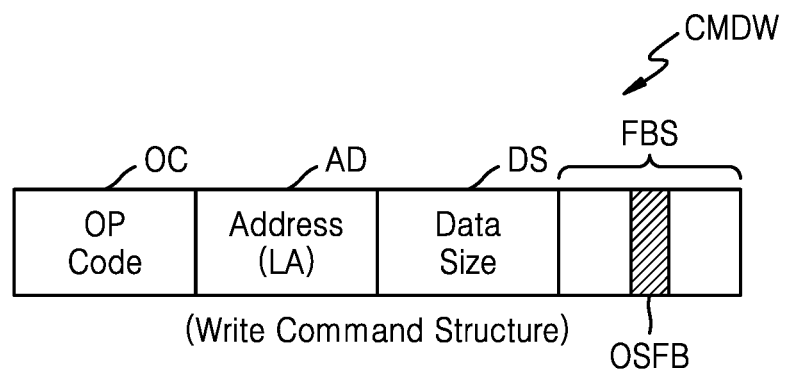
FIG. 10 is a diagram for explaining a sequential write flag bit.

FIG. 9 is a flowchart illustrating an embodiment of a method of determining sequential data, and FIG. 10 is a diagram for explaining a sequential write flag bit. The method of FIG. 9 may be performed in controller 110 of FIGS. 1 and 5.

Referring to FIGS. 1 and 9, controller 110 may receive a write command including a sequential write flag bit and write data from host 200 (operation S310). As shown in FIG. 10, the write command CMDW may include a plurality of flag bits FBS, and at least one bit of the plurality of flag bits FBS may be a sequential write flag bit OSFB.

Controller 110 may determine whether a sequential write flag is set in the write command, based on the sequential write flag bit OSFB of the write command (operation S320). When the sequential write flag bit OSFB has a first value, for example, '1', controller 110 may determine that the sequential write flag is set, and when the sequential write flag bit OSFB has a second value, for example, '0', controller 110 may determine that the sequential write flag is not set.

When it is determined that the sequential write flag is set, controller 110 may determine the write data to be sequential data (operation S330). Otherwise, when it is determined that the sequential write flag is not set, controller 110 may determine the write data to be non-sequential data (operation S340).

In other words, when the sequential write flag bit OSFB is '1', controller 110 may determine the write data to be sequential data. When the sequential write flag bit OSFB is '0', controller 110 may determine the write data to be non-sequential data.

Figure 11:
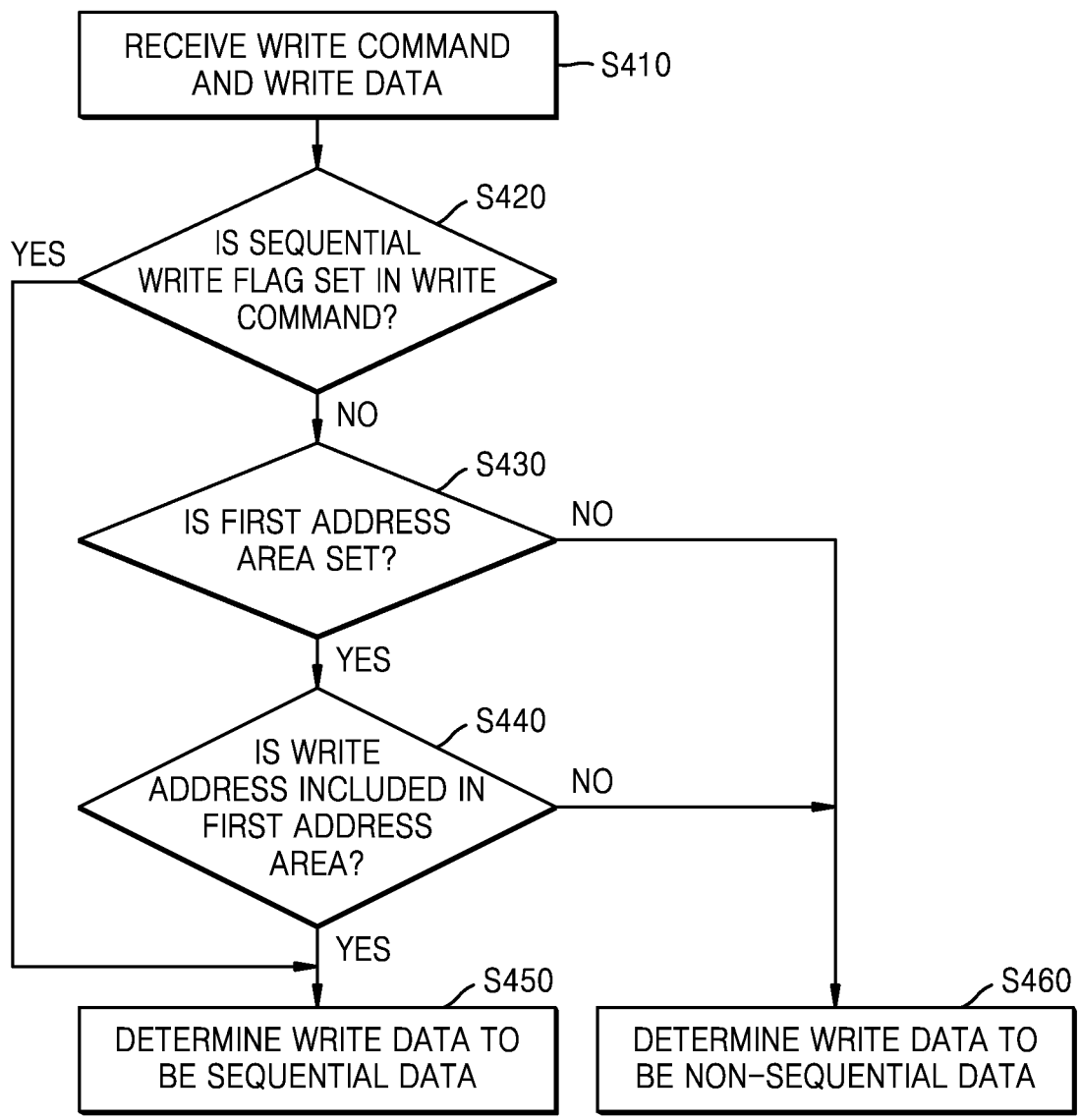
FIG. 11 is a flowchart illustrating an embodiment of a method of determining sequential data.

FIG. 11 is a flowchart illustrating an embodiment of a method of determining sequential data. The method of FIG. 11 may be performed in controller 110 of FIGS. 1 and 5.

Referring to FIGS. 1 and 11, controller 110 may receive a write command and write data (operation S410). That is, controller 110 may receive a write request from host 200.

Controller 110 may determine whether a sequential write flag is set in the write command (operation S420). Controller 110 may check whether a sequential write flag bit has a first value or a second value. When the sequential write flag bit has the first value (i.e., is set), controller 110 may determine the write data to be sequential data.

When it is determined that the sequential write flag has the second value (i.e., is not set), controller 110 may determine whether a first address area is set (operation S430). That is, controller 110 may check that there is a preset sequential data address area. When a setup command received from host 200 includes information on the first address area, the sequential data address area may be set based on the first address area If it is determined that the first address area is not set, controller 110 may determine the write data to be non-sequential data (operation S460). Otherwise, if it is determined that the first address area is set, that is, if the sequential data address area is set in advance, controller 110 may determine whether a write address included in the write command is included in the first address area (operation S440).

If it is determined that the write address is included in the first address area, controller 110 may determine the write data to be sequential data (operation S450). Otherwise, if it is determined that the write address is not included in the first address area, controller 110 may determine the write data to be non-sequential data (operation S460). In some embodiments, the order of operations S420 and S430 may be reversed.

As described with reference to FIGS. 6 to 11, controller 110 may determine whether received write data is sequential data, based on at least one of a flag bit and a write address included in a write command received from a host. Controller 110 may determine whether or not a write order is guaranteed, based on the write command without requiring a separate command for guaranteeing the write order.

Figure 12:
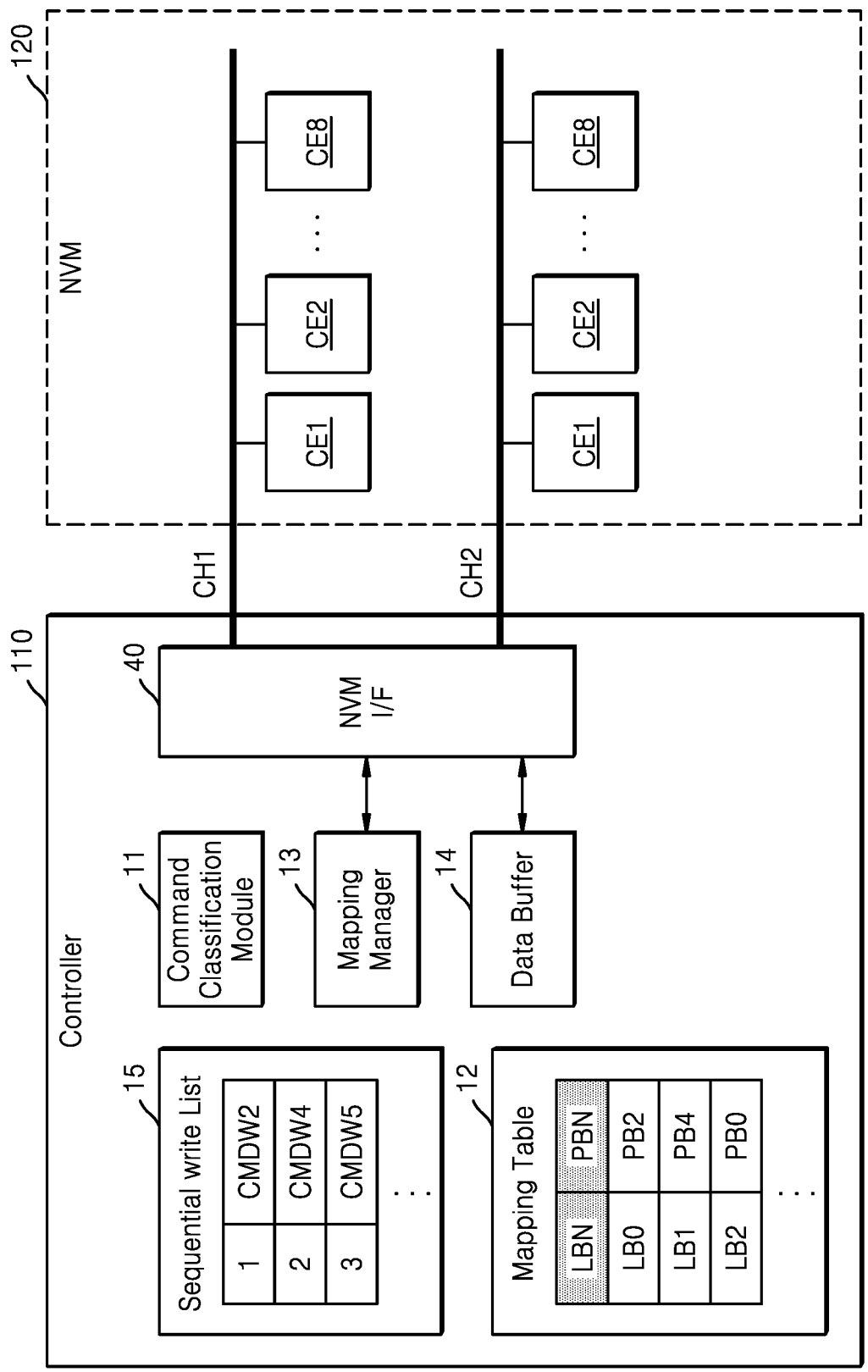
FIG. 12 is a diagram for explaining an embodiment of a method of guaranteeing a write order for sequential data.

FIG. 12 is a diagram for explaining an embodiment of a method of guaranteeing a write order for sequential data.

Referring to FIG. 12, when it is determined that received write data is sequential data, a command classification module 11 may generate a sequential write list 15 based on a write command corresponding to the sequential data. Command classification module 11 may list write commands corresponding to the sequential data in sequential write list 15 according to an order in which the write commands are received from a host. For example, when first to fifth write commands CMDW1 to CMDW5 are sequentially received and it is determined that second write data, fourth write data, and fifth write data corresponding to the second write command CMDW2, the fourth write command CMDW4, and the fifth write command CMDW5, respectively, are sequential data, command classification module 11 may sequentially list the second write command CMDW2, the fourth write command CMDW4, and the fifth write command CMDW5 in sequential write list 15. Mapping manager 13 may generate mapping data by allocating a physical address (e.g., PBN) to a logical address (e.g., LBN) of write data and may store the mapping data in mapping table 12. The write data may be programmed into memory cells corresponding to the physical address in non-volatile memory 120.

A write operation for the received write data, for example, the first to fifth write data, may be non-sequentially performed. For example, the first to fifth write data may be stored in data buffer 14, and the write operation for the first to fifth write data may be performed according to a write policy (or command execution policy) of controller 110. For example, as shown in FIG. 12, non-volatile memory 120 may include a plurality of channels, for example, a first channel CH1 and a second channel CH2, and each of the plurality of channels may include a plurality of memory devices, for example, first to eighth memory devices CE1 to CE8. A data write operation for the plurality of channels and the plurality of memory devices may be performed in parallel, and thus, resource utilization may increase and write latency may decrease. Thus, controller 110 may perform a write operation on the write data, for example, the first to fifth write data, based on a write policy that increases resource utilization. For example, a write order for the first to fifth write data may be determined by the type of data, a location or physical address at which write data is written, a write method (e.g., single level programming or multi level programming), data size, and the like.

However, since the second write data, the fourth write data, and the fifth write data are sequential data, a write order has to be guaranteed between the second write data, the fourth write data, and the fifth write data. As described above with reference to FIG. 1, an order of writing of data means an order in which the permanence of the data is guaranteed. Thus, controller 110 may control non-volatile memory 120 such that write operations (i.e., programming operations) for the second write data, the fourth write data, and the fifth write data are sequentially or non-sequentially started. However, controller 110 may sequentially update second mapping data, fourth mapping data, and fifth mapping data for the second write data, the fourth write data, and the fifth write data, respectively. For example, mapping manager 13 may sequentially update the second mapping data, the fourth mapping data, and the fifth mapping data according to a first in-first out (FIFO) control method, based on sequential write list 15. Mapping manager 13 may first update the second mapping data, which corresponds to the second write command CMDW2, first listed in sequential write list 15 among the second mapping data, the fourth mapping data, and the fifth mapping data, and may finally update the fifth mapping data, which corresponds to the fifth write command CMDW5, finally listed in sequential write list 15. For example, mapping manager 13 may update mapping data in response to a program completion signal provided from non-volatile memory 120. In this case, when the second mapping data is not updated, mapping manager 13 may delay updating of the fourth mapping data even if a program completion signal for the fourth write data is received. Mapping manager 13 may update the second mapping data after a program completion signal for the second write data is received and then update the fourth mapping data.

Figure 13:
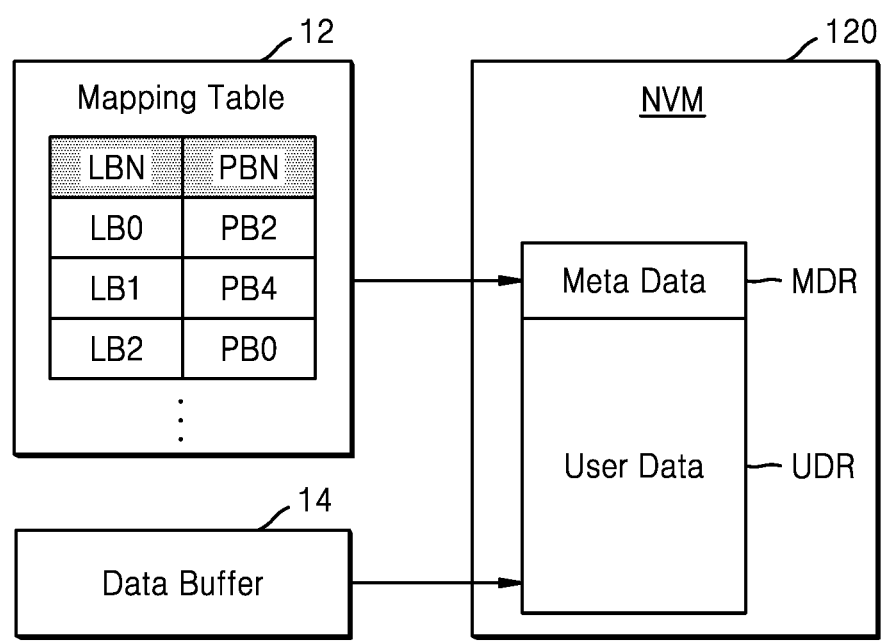
FIG. 13 is a diagram illustrating updating of mapping data.

FIG. 13 is a diagram illustrating updating of mapping data.

As shown in FIG. 13, non-volatile memory 120 may include a metadata area MDR and a user data area UDR. User data temporarily stored in data buffer 14, that is, data requested to be written from the outside, may be stored in the user data area UDR, and metadata may be stored in the metadata storage area MDR. The metadata is user data or data generated by controller 110 to manage non-volatile memory 120. For example, the metadata may include mapping data, write and erase counts of each block, wear leveling information, and the like.

The mapping data may be loaded from the metadata area MDR into mapping table 12, and changed mapping data may be written in the metadata area MDR, thereby updating the mapping data.

In an embodiment, mapping table 12 may be stored in another non-volatile memory device besides non-volatile memory 120. In this case, the mapping data may be updated as being stored in mapping table 12 without being written to non-volatile memory 120 separately.

Figure 14A:
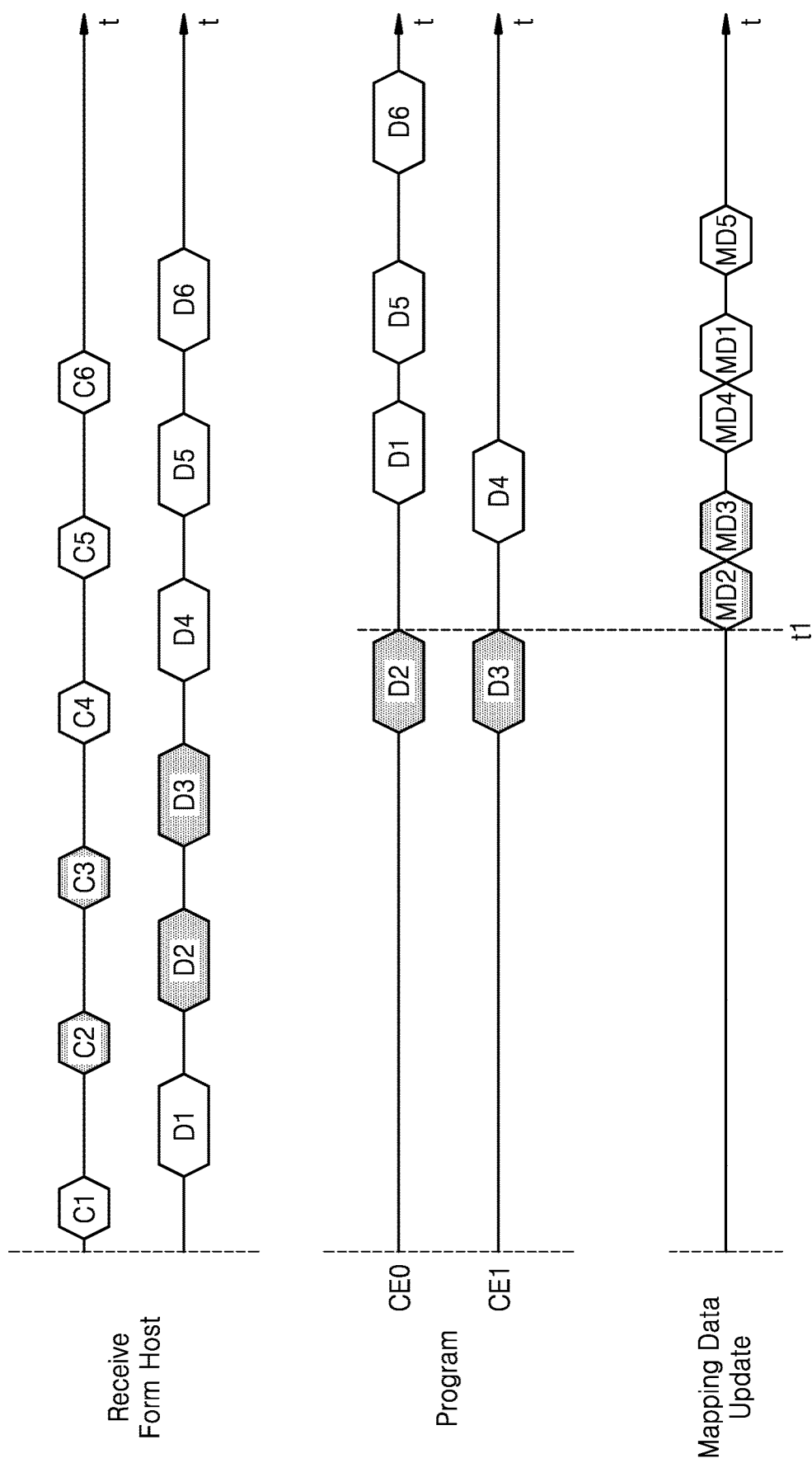
FIG. 14a and FIG. 14b are diagrams for explaining an embodiment of a method of operating a storage device.
Figure 14B:
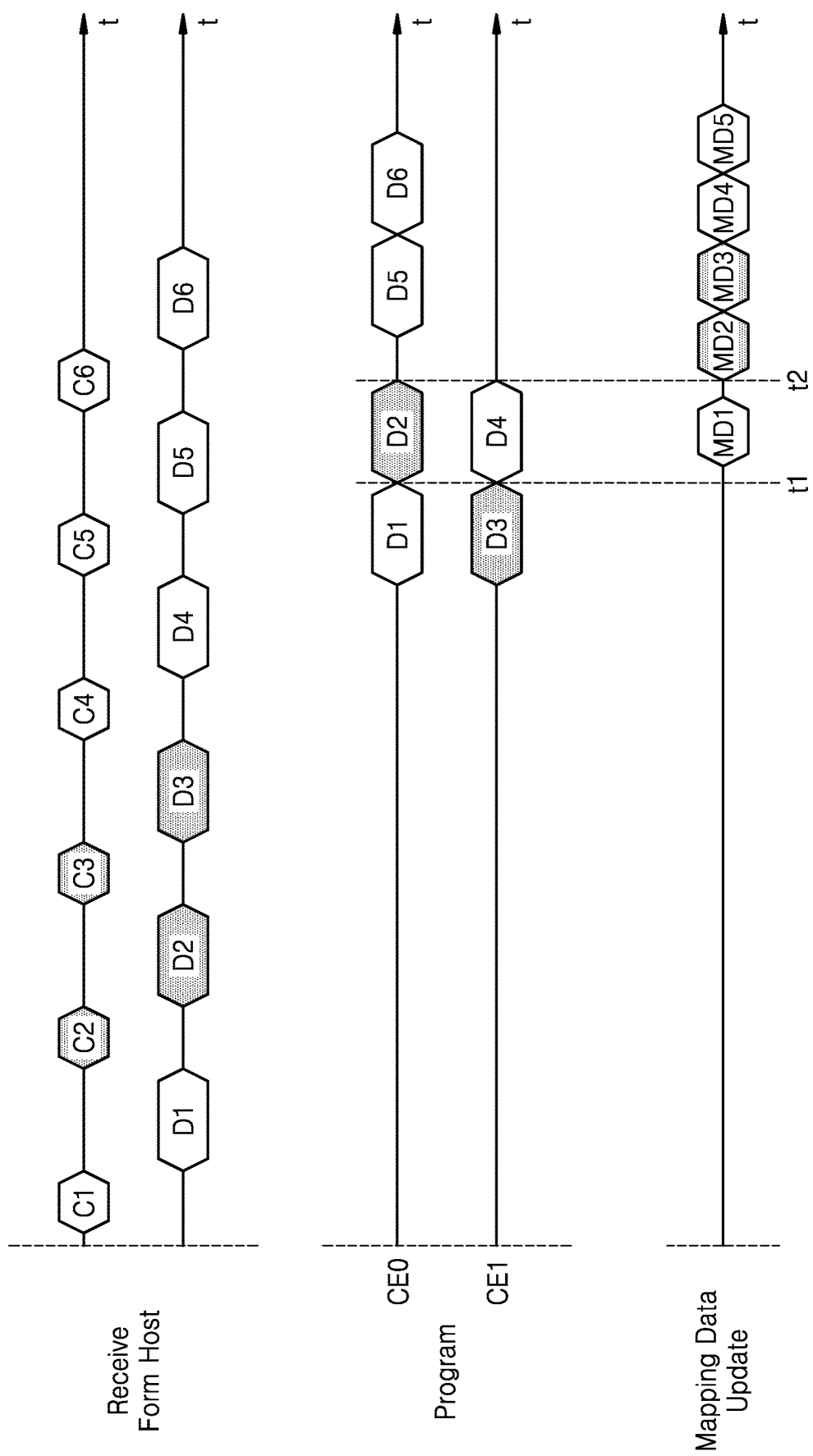

FIGS. 14A and 14B are diagrams for explaining an embodiment of a method of operating a storage device. FIGS. 14A and 14B are diagrams for explaining a method in which a storage device guarantees an order of writing of sequential data.

Referring to FIG. 14A, write commands C1 to C6 and write data D1 to D6 may be received from a host. As described above, the storage device may determine whether write data is sequential data, for example by determining whether an address included in a write command corresponds to a preset sequential data address area. Alternatively, the storage device may determine whether the write data is sequential data, based on a sequential write flag bit included in the write command.

It is assumed that second write data D2 for a second write command C2 and third write data D3 for a third write command C3 are determined to be sequential data. Depending on a write policy of the storage device, an order of writing of data may be determined.

Referring to FIG. 14A, the second write data D2 and the third write data D3 may be written in a first memory device CE0 and a second memory device CE1, respectively. Specifically, the second write data D2 and the third write data D3 may be programmed into the first memory device CE0 and the second memory device CE1, respectively. Although programming times of data are shown as being the same in FIG. 14A, this is for convenience of explanation, and the programming times of the data may be different depending on the states of memory devices, the size of the data, a programming method (e.g., programming level), and the like. Programming may be executed in parallel in the first memory device CE0 and the second memory device CE1, and the programming of the second write data D2 and the third write data D3 may be completed at time t1. In this case, since the second write data D2 and the third write data D3 are sequential data, an order of writing of the second write data D2 and the third write data D3, that is, an order of updating of the corresponding mapping data, may be determined according to an order in which writing is requested. Thus, after second mapping data MD2 for the second write data D2 is updated, third mapping data MD3 for the third write data D3 may be updated. Other data, for example, first write data D1 and fourth write data D4 to sixth write data D6 are non-sequential write data. Thus, an order of writing of the first write data D1 and the fourth write data D4 to the sixth write data D6 is not guaranteed. Mapping data corresponding to the first write data D1 and the fourth write data D4 to the sixth write data D6 may be updated regardless of whether other mapping data is updated or not. For example, first mapping data MD1 for the first write data D1 may be updated when the programming of the first write data D1 is completed.

Referring to FIG. 14B, the first write data D1 and the second write data D2 may be written (programmed) in the first memory device CE0 of a non-volatile memory, and the third write data D3 and the fourth write data D4 may be programmed into the second memory device CE1 of the non-volatile memory. Programming may be performed in parallel in the first memory device CE0 and the second memory device CE1, and the programming of the first write data D1 and the third write data D3 may be completed at time t1. For example, the first memory device CE0 and the second memory device CE1 may send a program completion signal to a controller. The controller may determine whether to update the first mapping data MD1 for the first write data D1 and the third mapping data MD3 for the third write data D3 in response to the program completion signal. The first mapping data MD1 for the first write data D1 may be updated. However, since the second write data D2 and the third write data D3 are sequential data, the third mapping data MD3 for the third write data D3 may not be updated before the second mapping data MD2 for the second write data D2 is updated. Thus, the third mapping data MD3 may be updated after the programming of the second write data D2 is completed at the time t2 and the second mapping data MD2 is updated.

Figure 15:
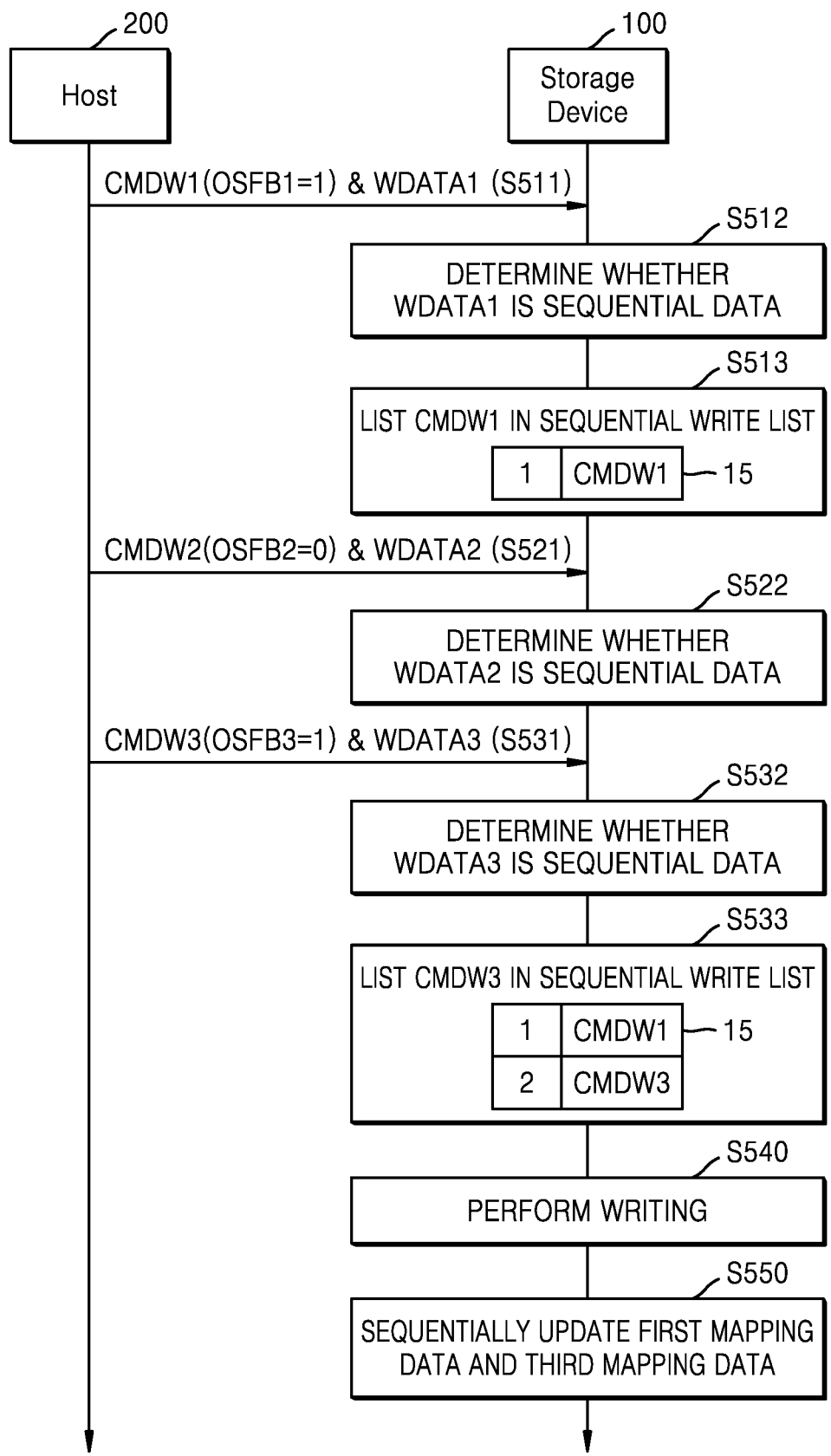
FIG. 15 is a flowchart illustrating an embodiment of a method of operating a storage system.

FIG. 15 is a flowchart illustrating an embodiment of a method of operating a storage system. A case, in which it is determined whether write data is sequential write data based on a sequential write flag bit OSFB of a write command, will be described as an example.

Referring to FIG. 15, a storage device (e.g., storage device 100) may receive a first write command CMDW1 and first write data WDATA1 from a host (e.g., host 200) (operation S511). In this case, a first sequential write flag bit OSFB1 included in the first write command CMDW1 may have a first value, for example, '1', and thus, a sequential write flag may be set.

Storage device 100 may determine whether the first write data WDATA1 is sequential data, based on the first sequential write flag bit OSFB1 (operation S512). The first write data WDATA1 may be determined to be sequential data, and accordingly, the first write command CMDW1 may be listed in a sequential write list 15 (operation S513).

Storage device 100 may receive a second write command CMDW2 and second write data WDATA2 from the host 200 (operation S521). A second sequential write flag bit OSFB2 included in the second write command CMDW2 may have a second value, for example, '0', and thus, a sequential write flag may be not set.

Storage device 100 may determine whether the second write data WDATA2 is sequential data, based on the second sequential write flag bit OSFB2 (operation S522). Since the sequential write flag is not set, storage device 100 may determine the second write data WDATA2 as non-sequential data. Accordingly, the second write command CMDW2 is not listed in sequential write list 15.

Thereafter, storage device 100 may receive a third write command CMDW3 and third write data WDATA3 from host 200 (operation S531). A third sequential write flag bit OSFB3 included in the third write command CMDW3 may have the first value, for example, '1', and thus, a sequential write flag may be set.

Storage device 100 may determine whether the third write data WDATA3 is sequential data, based on the third sequential write flag bit OSFB3 (operation S532). The third write data WDATA3 may be determined to be sequential data, and the third write command CMDW3 may be listed in sequential write list 15 (operation S533).

Thereafter, writing may be performed (operation S540). Storage device 100 may write the first write data WDATA1, the second write data WDATA2, and the third write data WDATA3 in a non-volatile memory. A write operation (i.e., programming) for the first write data WDATA1, the second write data WDATA2, and the third write data WDATA3 may be started sequentially or non-sequentially.

When the programming is completed, mapping data for the corresponding write data is updated. Since the first write data WDATA1 and the third write data WDATA3 are sequential data, first mapping data for the first write data WDATA1 and third mapping data for the third write data WDATA3 may be sequentially updated according to an order in which the first and third write commands CMDW1 and CMDW3 are listed in sequential write list 15. On the other hand, since second write data WDATA2 is non-sequential data, second mapping data for second write data WDATA2 may be updated out of order with respect to the first mapping data for the first write data WDATA1 and the third mapping data for the third write data WDATA3.

Figure 16:
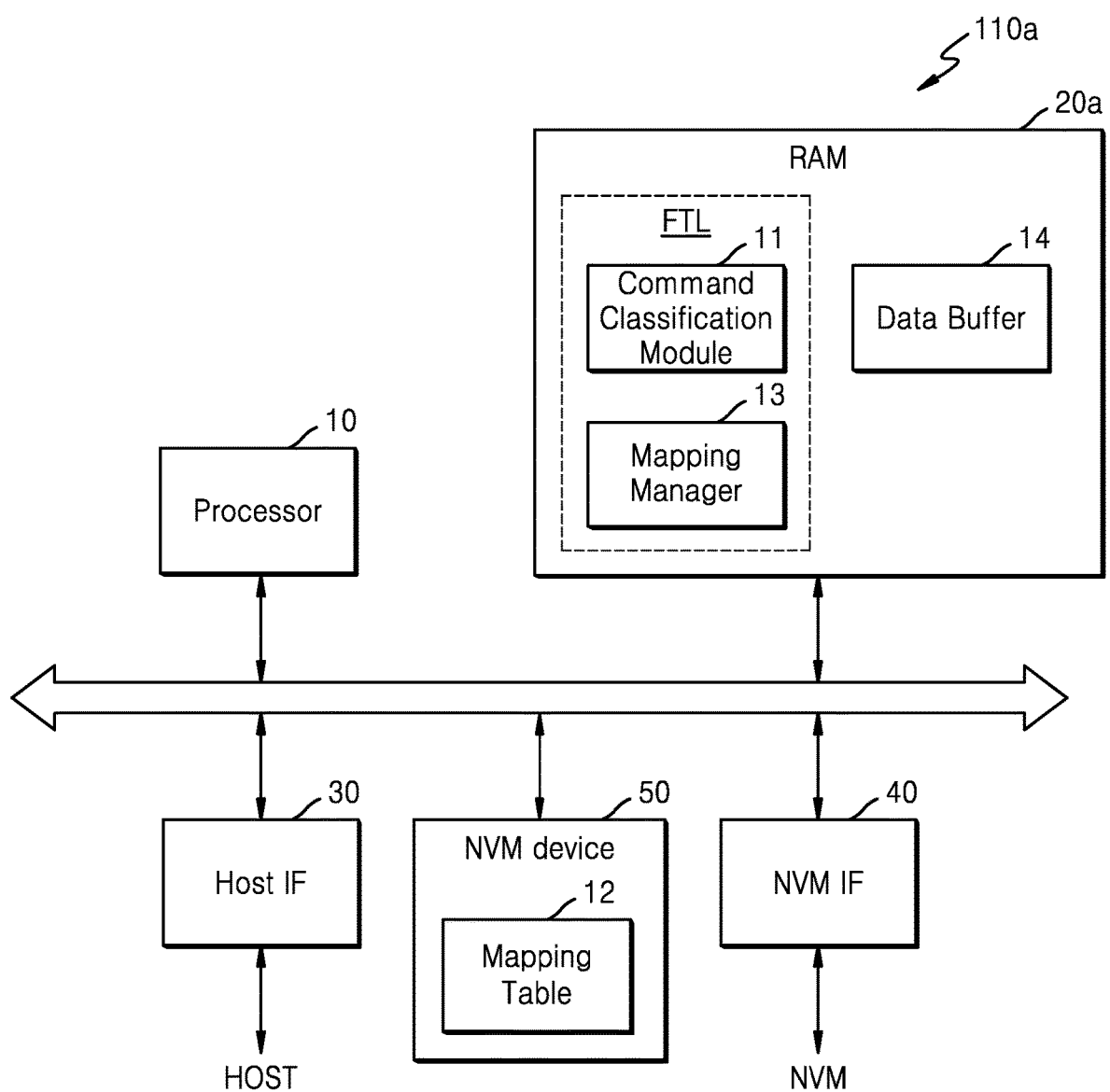
FIG. 16 is a block diagram of an embodiment of a controller of a storage system.

FIG. 16 is a block diagram of an embodiment of a controller 110a of a storage system.

Referring to FIG. 16, controller 110a may correspond to another embodiment of controller 110 of FIG. 5. Controller 110a may include processor 10, a RAM 20a, host interface 30, non-volatile memory interface 40, and a non-volatile memory device 50. Controller 110a may further include non-volatile memory device 50, compared to controller 110 of FIG. 5, and non-volatile memory device 50 may store mapping table 12. Non-volatile memory device 50 may include flash memory cells or resistive memory cells such as resistive RAM (ReRAM) memory cells, phase change RAM (PRAM) memory cells, and magnetic RAM (MRAM) memory cells. Mapping manager 13 may access non-volatile memory device 50 and manage mapping table 12, or may load mapping table 12 from non-volatile memory device 50 into RAM 20a and manage mapping table 12 loaded into RAM 20a. Mapping data may be updated by being stored in mapping table 12 of non-volatile memory device 50.

Figure 17:
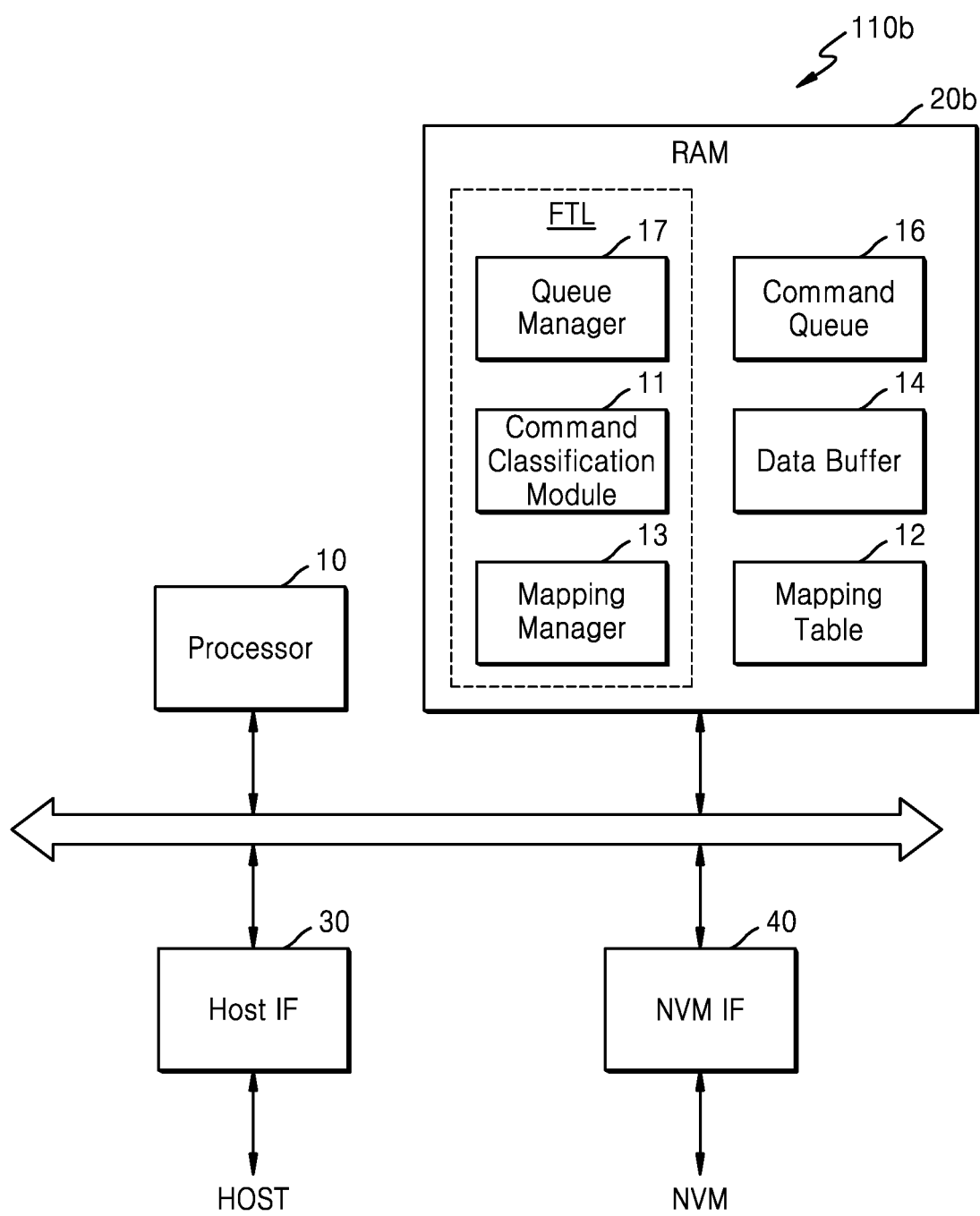
FIG. 17 is a block diagram of an embodiment of a controller of a storage system.
Figure 18:
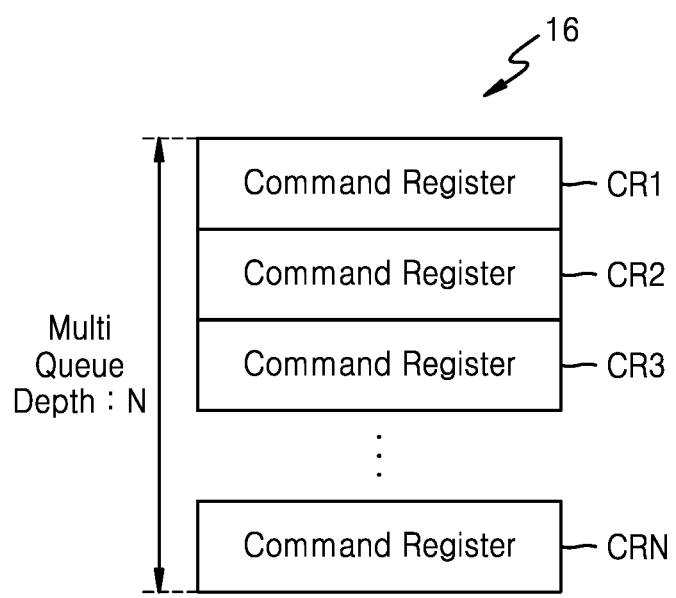
FIG. 18 is a diagram illustrating a command queue.

FIG. 17 is a block diagram of an embodiment of a controller 110b of a storage system. FIG. 18 is a diagram illustrating a command queue.

Referring to FIG. 17, controller 110b may correspond to another embodiment of controller 110 of FIG. 5. Controller 110b may include processor 10, a RAM 20b, host interface 30 and non-volatile memory interface 40. RAM 20b may include data buffer 14. RAM 20b may be loaded with command classification module 11, mapping manager 13, mapping table 12, a queue manager 17, and a command queue 16.

Controller 110b may support a command queue function. A plurality of commands received from a host may be queued in command queue 16. Accordingly, a storage device may perform an asynchronous input/output operation for receiving a new command during execution of a previously received command, thereby greatly improving the operation speed of the storage device.

Referring to FIG. 18, command queue 16 may include first to Nth command registers CR1 to CRN, and the first to Nth command registers CR1 to CRN may include information on first to Nth commands, respectively. N represents the number of command registers and is a natural number of 2 or more. N may be defined as a multi-queue depth, and controller 110b in FIG. 17 may receive commands corresponding to the multi-queue depth N from a host (e.g., host 200) and store commands in first to Nth command registers CR1 to CRN. Command information including a command ID, an address, a data size, a priority, and mode information may be stored in each of first to Nth command registers CR1 to CRN.

Queue manager 17 may determine whether commands queued in command queue 16 are ready. When a write command is in a ready state, write data may be received from the host together with a write execution command. Queue manager 17 may determine a ready setting order of commands based on an execution policy of the storage device or setting information (e.g., priority set in the commands) from the host. Accordingly, write commands corresponding to sequential data may be in a ready state non-sequentially. However, after write data is written, mapping data may be updated in an order in which write commands corresponding to the mapping data are received from the host, for example, in an order in which the write commands are queued in command queue 16.

Figure 19:
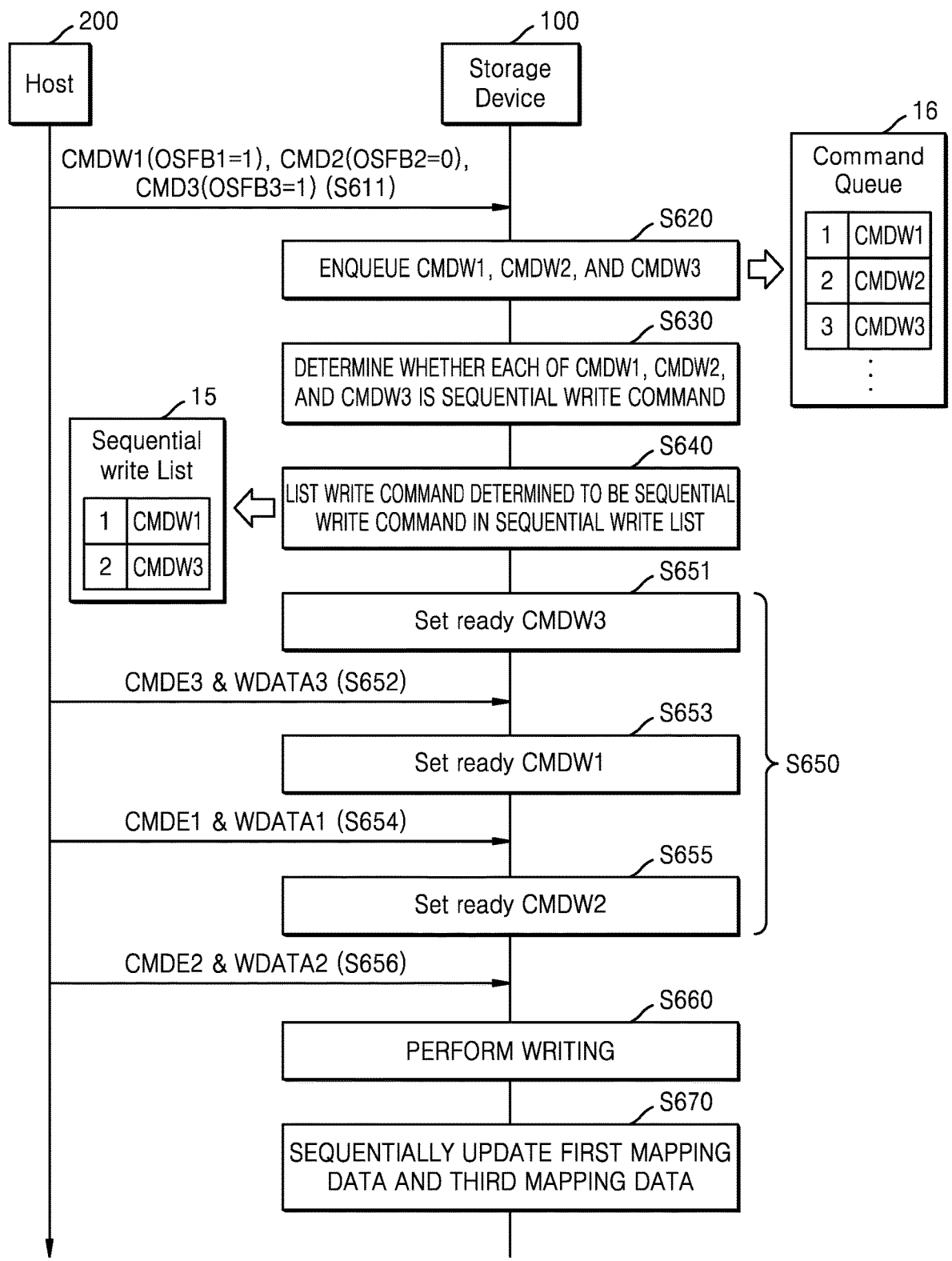
FIG. 19 is a flowchart illustrating an embodiment of a method of operating a storage system.

FIG. 19 is a flowchart illustrating an embodiment of a method of operating a storage system. A case, in which it is determined whether write data is sequential write data based on a sequential write flag bit OSFB of a write command and storage device 100 supports a command queue function, will be described as an example.

Referring to FIG. 19, storage device 100 may receive a plurality of write commands, for example, a first write command CMDW1, a second write command CMDW2, and a third write command CMDW3 in sequence from host 200 (operation S611). It is assumed that a first sequential write flag bit OSFB1 included in the first write command CMDW1 and a third sequential write flag bit OSFB3 included in the third write command CMDW3 have a first value, for example, '1', and a second sequential write flag bit OSFB2 included in the second write command CMDW2 has a second value, for example, '0'.

Storage device 100 may queue the first write command CMDW1, the second write command CMDW2, and the third write command CMDW3 to the command queue 16 in an order in which they are received.

Storage device 100 may determine whether each of the first write command CMDW1, the second write command CMDW2, and the third write command CMDW3 is a sequential write command (operation S630). That is, storage device 100 may determine whether write data to be received corresponding to each of the first write command CMDW1, the second write command CMDW2, and the third write command CMDW3 is sequential data. Storage device 100 may determine whether the first write command CMDW1, the second write command CMDW2, and the third write command CMDW3 are sequential write commands, based on the first to third sequential write flag bits OSFB1 to OSFB3.

Storage device 100 may list a write command determined to be a sequential write command in sequential write list 15 (operation S640). Since the first sequential write flag bit OSFB1 and the third sequential write flag bit OSFB3 have the first value, the first write command CMDW1 and the third write command CMDW3 may be determined to be sequential write commands and may be listed in sequential write list 15. The first write command CMDW1 and the third write command CMDW3 may be listed in sequential write list 15 according to an order in which the first write command CMDW1 and the third write command CMDW3 are received.

Thereafter, storage device 100 may determine an order (i.e., a ready setting order) in which the first write command CMDW1, the second write command CMDW2, and the third write command CMDW3 are in a ready state (operation S650). Storage device 100 may determine the ready setting order for the first write command CMDW1, the second write command CMDW2, and the third write command CMDW3 based on an execution policy or setting information from the host. Storage device 100 may set the first write command CMDW1, the second write command CMDW2, and the third write command CMDW3 to the ready state according to the determined order.

As shown in FIG. 19, when the third write command CMDW3 is set to the ready state (operation S651), an execution command CMDE3 for the third write command CMDW3 and the third write data WDATA3 may be received from host 200 (operation S652). Similarly, when the first write command CMDW1 is set to the ready state (operation S653), an execution command CMDE1 for the first write command CMDW1 and the first write data WDATA1 may be received from host 200 (operation S654). When the second write command CMDW12 is set to the ready state (operation S655), an execution command CMDE2 for the second write command CMDW2 and the second write data WDATA2 may be received from host 200. In an embodiment, the received first to third write data WDATA1 to WDATA3 may be temporarily stored in a data buffer of storage device 100. Thereafter, writing may be performed (operation S660). However, embodiments are not limited thereto, and some of the first to third write data may be written immediately after being received. Storage device 100 may write the first write data WDATA1, the second write data WDATA2, and the third write data WDATA3 in a non-volatile memory. A write operation (i.e., programming) for the first write data WDATA1, the second write data WDATA2, and the third write data WDATA3 may be started sequentially or non-sequentially.

When the programming is completed, mapping data for write data is updated. Since the first write data WDATA1 and the third write data WDATA3 are sequential data, first mapping data for the first write data WDATA1 and third mapping data for the third write data WDATA3 may be sequentially updated according to an order in which the first write command CMDW1 and the third write command CMDW3 are listed in sequential write list 15 (operation S670). On the other hand, since second write data WDATA2 is non-sequential data, second mapping data for second write data WDATA2 may be updated out of order with respect to the first mapping data for the first write data WDATA1 and the third mapping data for the third write data WDATA3.

Figure 20:
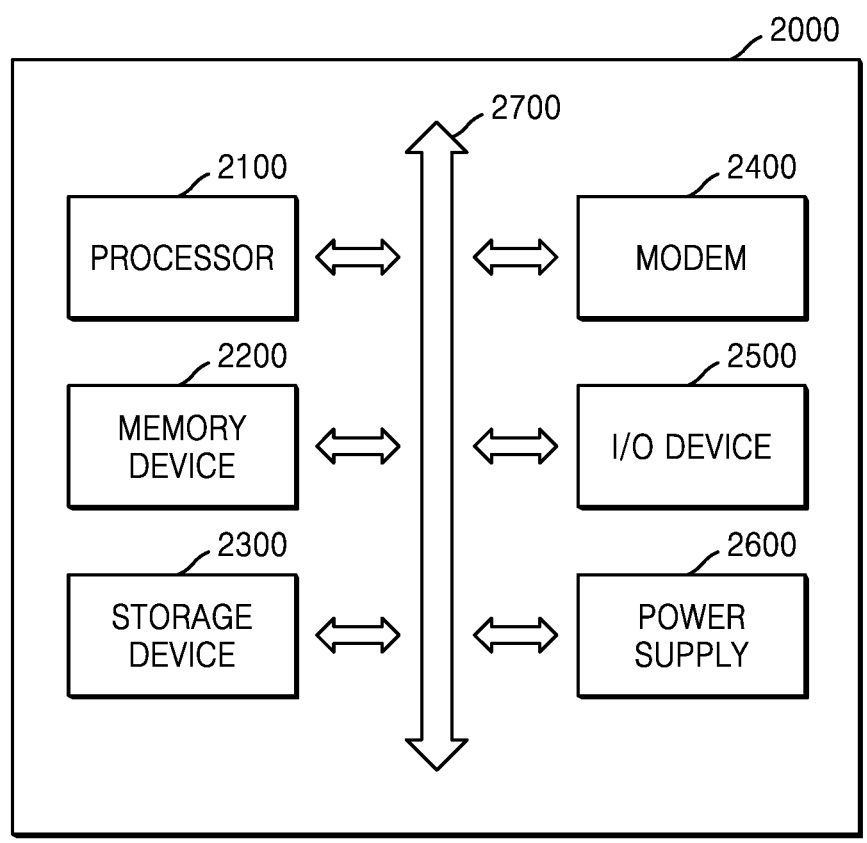
FIG. 20 is a block diagram of an embodiment of an electronic device.

FIG. 20 is a block diagram of an embodiment of an electronic device 2000.

Referring to FIG. 20, electronic device 2000 may include a processor 2100, a memory device 2200, a storage device 2300, a modem 2400, an input/output (I/O) device 2500, and a power supply 2600. In addition, electronic device 2000 may further include other intellectual property (IP) blocks. In an embodiment, storage device 2300 may be implemented using the embodiments described above with reference to FIGS. 1 to 19. Storage device 2300 may determine whether write data is sequential data that has to be written according to a determined order, for example, a write request order, based on identification information and information on a sequential data address area received from processor 2100 or another master intellectual property (IP) core, and may guarantee a write order, that is, a permanence order of the write data when the write data is sequential data. Accordingly, the write reliability and write performance of storage device 2300 may be improved.

Various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, or any other form of storage medium known in the art.

While the inventive concept has been particularly shown and described with reference to embodiments thereof, it will be understood that various changes in form and details may be made therein without departing from the spirit and scope of the following claims.

What is claimed is:

1. A method of operating a storage device including a non-volatile memory, the method comprising:
    the storage device receiving from a host a first write command and information on a first address area in which sequential data is to be stored, wherein the sequential data is required to be written according to a write request order;
    determining, based on the first write command, whether first write data for the first write command is the sequential data that is required to be written according to the write request order;
    writing the first write data in the non-volatile memory; and
    when the first write data and second write data for a second write command are the sequential data, sequentially updating first mapping data, including a first mapping relationship between a first logical address and a first physical address for the first write data, and second mapping data, including a second mapping relationship between a second logical address and a second physical address for the second write data, according to an order in which the first write command and the second write command are received,
    wherein the determining comprises determining whether the first write data is the sequential data that is required to be written according to the write request order, based on whether the first logical address for the first write data included in the first write command is included in the first address area.

2. The method of claim 1, wherein the information on the first address area comprises information on a logical address indicating the first address area.

3. The method of claim 1, wherein the information on the first address area is included in a setup command received from the host prior to receiving the first write command.

4. The method of claim 1, wherein determining whether the first write data is the sequential data is based on a value of a first flag bit included in the first write command.

5. The method of claim 1, wherein sequentially updating the first mapping data and the second mapping data comprises writing the first mapping data and the second mapping data to the non-volatile memory.

6. The method of claim 1, wherein sequentially updating the first mapping data and the second mapping data comprises writing the first mapping data and the second mapping data to a non-volatile storage area in the storage device.

7. The method of claim 1, wherein sequentially updating the first mapping data and the second mapping data comprises:
    receiving a program completion signal for the first write data; and
    determining whether to update the first mapping data based on the order in which the first write command and the second write command are received.

8. The method of claim 7, wherein determining whether to update the first mapping data comprises:
    updating the first mapping data when the first write command is received before the second write command, or when the second write command is received before the first write command and the second mapping data is updated; and
    delaying the update of the first mapping data when the second write command is received before the first write command and the second mapping data is not updated.

9. A method of operating a storage device including a non-volatile memory, the method comprising:
    the storage device receiving from a host a first write command, a first logical address, and first write data;
    determining whether the first write data is sequential data, based on a first flag bit of the first write command;
    programming the first write data into a first area of the non-volatile memory corresponding to a first physical address; and
    updating first mapping data including a mapping relationship between the first logical address and the first physical address for the first write data,
    wherein, when second write data for a second write command received before the first write command is the sequential data, then updating the first mapping data comprises updating the first mapping data after updating second mapping data for the second write data when it is determined based on the first flag bit of the first write command that the first write data is the sequential data.

10. The method of claim 9, wherein updating the first mapping data comprises updating the first mapping data after programming of the first write data is completed.

11. The method of claim 9, wherein updating the first mapping data comprises writing the first mapping data to the non-volatile memory or to a second non-volatile storage area.

12. The method of claim 9, further comprising determining that the first write data is the sequential data when the first flag bit of the first write command has a first value, and determining that the second write data is non-sequential data, when the first flag bit of the second write command has a second value.

13. The method of claim 9, further comprising determining whether the first write data is sequential data based on whether the first logical address is included in a first address area set in advance of the storage device receiving the first write command.

14. A storage device, comprising:
a non-volatile memory; and
a controller configured to control access to the non-volatile memory,
wherein the controller comprises:
a command classification module that determines, based on a first write command received by the storage device from a host, whether first write data for the first write command is sequential data; and
a mapping manager that determines an order of updating of logical-physical address mapping data for the first write data, based on an order in which the first write command and another write command, corresponding to other sequential data, are received from the host, when the first write data is determined to be sequential data,
wherein the mapping manager determines the order of updating such that the logical-physical address mapping data for the first write data is updated after logical-physical address mapping data for the other sequential data is updated, when the first write command is received after the other write command.

15. The storage device of claim 14, wherein the command classification module determines that the first write data is the sequential data when a first logical address included in the first write command is included in a first address area set in advance of receiving the first write command.

16. The storage device of claim 14, wherein the command classification module determines that the first write data is the sequential data when a flag bit included in the first write command has a first value, and determines that the first write data is not the sequential data when the flag bit included in the first write command has a second value different from the first value.

17. The storage device of claim 14, wherein the mapping manager updates the logical-physical address mapping data by controlling writing to the non-volatile memory according to a determined order when a program completion signal for the first write data is received from the non-volatile memory.

18. The storage device of claim 14, wherein the non-volatile memory comprises a flash memory.

* * * * *